(12) United States Patent
Hsueh

(10) Patent No.: US 11,956,503 B2
(45) Date of Patent: Apr. 9, 2024

(54) CONTROLLING A DEVICE BASED ON AN AUDIO INPUT

(71) Applicant: Comcast Cable Communications, LLC, Philadelphia, PA (US)

(72) Inventor: Tsung-Hsiang Hsueh, Morganville, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 160 days.

(21) Appl. No.: 16/953,969

(22) Filed: Nov. 20, 2020

(65) Prior Publication Data
US 2021/0076096 A1    Mar. 11, 2021

Related U.S. Application Data

(63) Continuation-in-part of application No. 16/038,783, filed on Mar. 25, 2019, which is a continuation of application No. 14/876,687, filed on Oct. 6, 2015, now Pat. No. 10,057,642.

(51) Int. Cl.
| | |
|---|---|
| H04N 21/443 | (2011.01) |
| H02J 3/00 | (2006.01) |
| H02J 13/00 | (2006.01) |
| H04B 5/00 | (2006.01) |
| H04N 21/4147 | (2011.01) |
| G06F 1/26 | (2006.01) |
| G06F 1/3234 | (2019.01) |

(52) U.S. Cl.
CPC .......... *H04N 21/4432* (2013.01); *H02J 3/00* (2013.01); *H02J 13/00* (2013.01); *H04B 5/00* (2013.01); *H04N 21/4147* (2013.01); *G06F 1/266* (2013.01); *G06F 1/3234* (2013.01)

(58) Field of Classification Search
CPC ... H04N 21/4432; H04N 21/4147; H02J 3/00; H02J 13/00; H04B 5/00; G06F 1/266; G06F 1/3234
See application file for complete search history.

(56) References Cited

U.S. PATENT DOCUMENTS

| | | | |
|---|---|---|---|
| 4,737,718 A | 4/1988 | Kemner et al. | |
| 8,412,387 B2 | 4/2013 | Park et al. | |
| 9,172,245 B1 | 10/2015 | Lentine et al. | |
| 9,230,559 B2 * | 1/2016 | Yoon ................ | H04N 21/42203 |

(Continued)

OTHER PUBLICATIONS

Xfinity voice commands FAQ, pp. 1-6.*

*Primary Examiner* — Aurel Prifti
(74) *Attorney, Agent, or Firm* — Banner & Witcoff, Ltd.

(57) ABSTRACT

Systems and methods are described herein for provisioning power to a power consumption device in a depowered state (e.g., a device not consuming current such as standby current). Aspects discussed herein relate to receiving a first portion of audio input via a tuning fork. A vibration amplitude of the tuning fork may be compared with a reference amplitude. Voice recognition may be performed to determine one or more voice commands in a second portion of the audio input and an appropriate action may be taken based on the voice commands. Aspects discussed herein also relate to receiving a plurality of signals that energize an energy accumulator, activating a decoder based on an accumulated energy in the energy accumulator, and processing the signals to activate a power consumption device.

21 Claims, 11 Drawing Sheets

(56) References Cited

U.S. PATENT DOCUMENTS

| | | | |
|---|---|---|---|
| 9,325,516 B2 | 4/2016 | Pera et al. | |
| 9,516,442 B1* | 12/2016 | Dusan | H04R 1/1016 |
| 11,405,584 B1* | 8/2022 | Grover | H04N 7/147 |
| 2002/0097546 A1 | 7/2002 | Weinberger | |
| 2004/0099738 A1 | 5/2004 | Waters | |
| 2004/0220798 A1* | 11/2004 | Chi | G10L 17/22 |
| | | | 704/E17.015 |
| 2007/0005652 A1 | 1/2007 | Choi et al. | |
| 2007/0213879 A1 | 9/2007 | Iwamura et al. | |
| 2008/0133228 A1* | 6/2008 | Rao | G10L 15/24 |
| | | | 704/E15.001 |
| 2008/0201133 A1* | 8/2008 | Cave | G10L 15/1815 |
| | | | 704/E15.024 |
| 2009/0037175 A1* | 2/2009 | Wang | G10L 15/1822 |
| | | | 704/E15.04 |
| 2009/0076798 A1* | 3/2009 | Oh | G10L 15/1815 |
| | | | 704/9 |
| 2009/0323257 A1 | 12/2009 | Sarid et al. | |
| 2011/0112838 A1* | 5/2011 | Adibi | G10L 17/02 |
| | | | 704/E17.003 |
| 2011/0225441 A1 | 9/2011 | Chueh et al. | |
| 2011/0296169 A1 | 12/2011 | Palmer | |
| 2012/0201312 A1 | 8/2012 | Schwager et al. | |
| 2012/0215537 A1* | 8/2012 | Igarashi | H04N 21/42204 |
| | | | 704/E15.004 |
| 2012/0221329 A1* | 8/2012 | Harsch | H04R 3/02 |
| | | | 704/E21.002 |
| 2012/0221330 A1* | 8/2012 | Thambiratnam | G10L 25/84 |
| | | | 704/235 |
| 2012/0281547 A1 | 11/2012 | Kim et al. | |
| 2012/0309308 A1 | 12/2012 | Kim et al. | |
| 2012/0323573 A1* | 12/2012 | Yoon | G09B 19/06 |
| | | | 704/E15.001 |
| 2013/0110521 A1* | 5/2013 | Hwang | H04W 52/028 |
| | | | 704/500 |
| 2013/0122806 A1 | 5/2013 | Yun | |
| 2013/0132086 A1* | 5/2013 | Xu | G10L 15/005 |
| | | | 704/251 |
| 2013/0234658 A1 | 9/2013 | Endo et al. | |
| 2013/0241284 A1 | 9/2013 | Santini et al. | |
| 2013/0339028 A1* | 12/2013 | Rosner | G10L 15/22 |
| | | | 704/E11.001 |
| 2014/0119233 A1 | 5/2014 | Palani et al. | |
| 2014/0149758 A1 | 5/2014 | Rajkotia et al. | |
| 2014/0192912 A1 | 7/2014 | Chappel et al. | |
| 2014/0197783 A1 | 7/2014 | Kim et al. | |
| 2014/0278394 A1* | 9/2014 | Bastyr | G10L 21/0208 |
| | | | 381/92 |
| 2014/0278435 A1* | 9/2014 | Ganong, III | G10L 15/22 |
| | | | 704/275 |
| 2014/0325245 A1 | 10/2014 | Santini et al. | |
| 2014/0329467 A1 | 11/2014 | Ewing et al. | |
| 2014/0341380 A1* | 11/2014 | Zheng | H04R 29/006 |
| | | | 381/56 |
| 2015/0063575 A1* | 3/2015 | Tan | G06F 16/683 |
| | | | 381/56 |
| 2015/0117695 A1* | 4/2015 | Barrentine | H04R 1/1025 |
| | | | 381/380 |
| 2016/0006264 A1 | 1/2016 | Alperin et al. | |
| 2016/0181863 A1 | 6/2016 | Suman et al. | |
| 2016/0294227 A1 | 10/2016 | Podkamien et al. | |
| 2016/0323698 A1 | 11/2016 | Guerrero Ramirez et al. | |
| 2016/0329751 A1 | 11/2016 | Mach et al. | |
| 2016/0336807 A1 | 11/2016 | Mach et al. | |
| 2016/0336815 A1 | 11/2016 | Alperin et al. | |
| 2017/0005652 A1 | 1/2017 | Hatano et al. | |
| 2017/0093170 A1* | 3/2017 | Saunamaki | H02J 50/12 |
| 2017/0093175 A1 | 3/2017 | Shao et al. | |
| 2021/0076096 A1 | 3/2021 | Hsueh | |

* cited by examiner

CONTROLLING A DEVICE BASED ON AN AUDIO INPUT

CROSS-REFERENCE TO RELATED APPLICATIONS

This application is a Continuation-In-Part of U.S. patent application Ser. No. 16/038,783, filed Mar. 25, 2019, and entitled "Controlling The Provision Of Power To One Or More Devices," which is a Continuation of U.S. patent application Ser. No. 14/876,687, filed Oct. 6, 2015, and entitled "Controlling The Provision Of Power To One Or More Devices," now U.S. Pat. No. 10,057,642, each disclosure of which is incorporated by reference herein in its entirety and made part hereof.

BACKGROUND

Electronic and electrical devices draw power when in use. When not in use, devices may be programmed or designed to enter into a low-power mode or a "standby" mode. For example, televisions, computers, content devices such as DVD players or set-top-boxes, refrigerators, heaters, air conditioners, and other like devices may be programmed to enter standby mode, even in a situation where a user indicates the device should be turned "off." Rationales for such programming or design may vary; for example, a standby-powered device may be able to enter a fully-powered useable state more quickly than a completely depowered device.

SUMMARY

The following summary is for illustrative purposes only, and is not intended to limit or constrain the detailed description. The following summary merely presents various described aspects in a simplified form as a prelude to the more detailed description provided below.

A device operating in a standby mode may still consume power. Each device may consume a small amount of power individually (e.g., 5V at 30 mA consumes 0.15 watts-hour per hour), although the amount in the aggregate over a region may be equal to superfluous operation of a small power station. Furthermore, the consumption of power by each individual device, even a small amount of power, may degrade components of the device and reduce a mean time between failure for the device. Unplugging a device or opening a switch (e.g., at a power strip, via a wall switch, or via a smart power outlet controlled wired or wirelessly by a controller device) may result in a severe loss of functionality, as the device may not be able to perform operations beneficial to the user and/or undertake maintenance operations. As an example, a digital video recorder (DVR) may need to be powered so as to record scheduled content, perform maintenance such as receiving software and firmware updates or authenticating permissions to record and/or playback content, or other like features or functionality. Such features may be performed in the absence of a user, although they may not occur if the DVR is completely-depowered. Hence, many users keep their devices in standby mode, resulting in unnecessary power consumption.

According to some aspects addressing these and other problems apparent upon reading of the specification, a power-consumption device may be electrically connected (e.g., plugged into) a power outlet, such as a smart power outlet controllable and/or monitorable via a wired or wireless network. The device and/or the power outlet may be configured to not allow "standby" current to be drawn to the device. For example, the power outlet may be configured to not provide "standby" current to the device because a switch may be in an open state between a power source and the power outlet and/or between the power outlet and the device. The switch may be controlled by a controller and/or a detector. A multi-purpose signal may be provided to the detector. For example, the signal may provide the detector operating power (e.g., "bootstrap" power) to close a thyristor, relay, gate, or other switch to provide operating power to the detector from the mains or other power source (e.g., a battery or the like). The signal may also provide information to the detector, in the form of a message, instructions, commands, or the like to enable the detector to perform a determination as to whether to provide operating power to a power-consumption device.

In some aspects, a controller may transmit a wireless signal which may be used to provide bootstrap power to wake up a detector module via resonant coupling. The transmitted signal may bootstrap power to the detector, where the power transferred by transmission of the wireless signal may enable the detector to turn on a first switch causing the detector to fully power up and continue to draw power from the power lines and no longer depend on the radio signal for power. The transmitted signal may provide commands and/or instructions to the detector. Once the detector is fully powered, it may process the message in the transmitted signal and decode the necessary command and/or instructions. In some embodiments, the controller may be located at a location different from one attached or coupled to the power lines that are feeding a target device. The controller may be any device capable of receiving a signal and capable of transmitting a signal via resonance over a control distance. The control distance may be a function of strength of the wireless signal and an efficiency of the resonant power coupling.

One or more tuning forks may be used to allow voice activation of a power consumption device. The tuning forks may vibrate in the presence of a user's voice, and one or more comparators may compare the vibration of the tuning forks with stored information indicating expected vibrations of the user's voice. Multiple tuning forks may be used, each corresponding to a different audio tone, and the stored information may indicate audio tones of the user's voice.

An energy accumulator may be used to accumulate energy and use the energy to periodically activate a device. A solar cell may receive light and charge an energy storage device, such as a capacitor, and after the capacitor storage reaches a threshold level, the capacitor energy may activate a device that is otherwise in a "sleep" mode. The activated device may then take any desired action, such as monitoring for the presence of a data signal. The light may also carry this data signal, and the activated device may be a device to detect the data. A laser, having data modulated thereon, may be aimed at the solar cell for a threshold time duration. The light from the laser may initially provide energy to charge the capacitor, which may in turn activate a detector or demodulator device that can monitor the laser light for the presence of the modulated data. The time duration may be of sufficient length to allow both the charging of the capacitor and the functioning of the detector or demodulator device.

This summary is not intended to identify critical or essential features of the disclosure herein, but instead to merely summarize certain features and variations thereof. The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

One or more aspects of the present disclosure provide mechanisms that operate to provide a signal for provisioning bootstrap power to a detector and provide within the signal commands. According to aspects discussed herein, a powered controller may communicate a signal to a detector. The signal may be communicated wirelessly, e.g., via resonant coupling. The signal may provide power to the detector and provide command or control instructions to the detector. Prior to providing the signal to the detector, the detector may be unpowered or in a non-powered state having zero power consumption, or minimal power consumption resulting from leak currents due to imperfections in insulating materials or the like. The controller may be any device capable of receiving a signal and capable of transmitting a signal via resonance. The control distance may be a function of strength of the radio signal and the efficiency of the resonant power coupling.

Based on the signal, the detector may activate a first switch, gate, thyristor, relay, or any other type of switch device/component to provide the detector power to receive the signal in a detecting component, and processes and/or decode the signal to receive an instruction in the signal. If the instruction is to perform an additional action, such as providing power to an outlet or a downstream device (e.g., a load), the detector may perform the action. For example, the device may be instructed to provide downstream power and may actuate a second switch.

As noted above, aspects discussed herein may relate to providing a signal to a detector to provision power to a device. Aspects discussed herein may relate to providing within a signal commands and instructions. Before discussing these concepts in greater detail, several examples of computing devices and system architectures that may be used in implementing and/or otherwise providing various aspects of the disclosure will first be discussed with respect to FIGS. 1 and 2.

Figure 1:
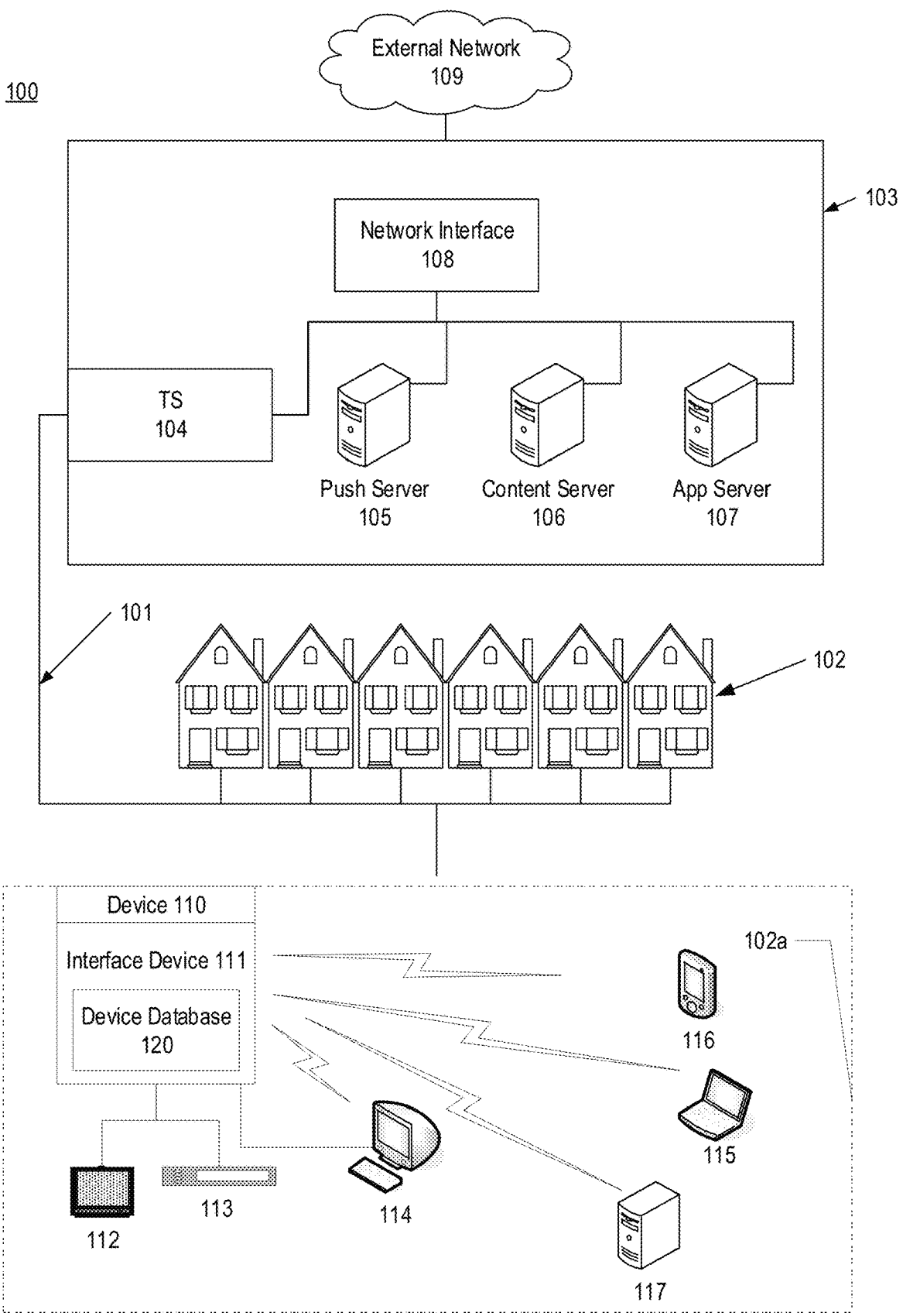
FIG. 1 depicts an example communication network on which various features described herein may be used.

FIG. 1 illustrates an example communication network 100 on which many of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect various premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface 104, such as a termination system (TS). More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which may permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) or device(s).

The local office 103 may also include one or more application servers 107. An application server 107 may be one or more computing devices configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. An application server may be responsible for monitoring user viewing habits and collecting that information for use in selecting advertisements. An application server may be responsible for receiving and transmitting communications related to a security system in accordance with the present disclosure. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data, which may include security system access information, restrictions, and access logs as a result of performing steps described herein.

An example premises 102a, such as a home, may include an interface 120. The interface 120 may include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local WiFi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be one or more computing devices that communicate with the modem(s) 110 to allow one or more other devices in the premises 102a, to communicate with the local office 103 and other devices beyond the local office 103. The gateway interface device 111 may be a set-top box (STB), digital video recorder (DVR), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g., Voice over Internet Protocol—VoIP phones), home security system 119, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, BLUETOOTH interfaces, and others.

Figure 2:
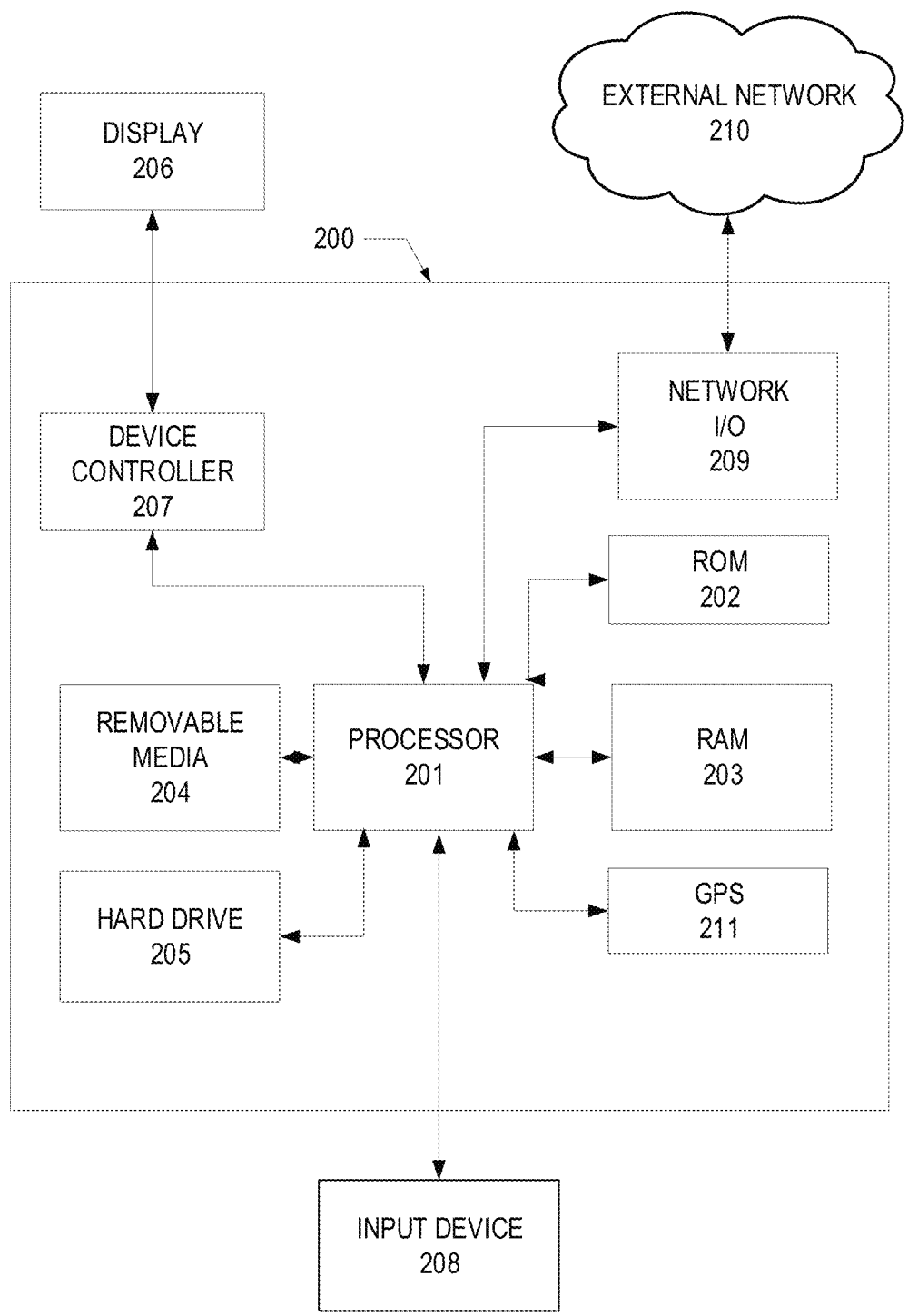
FIG. 2 depicts an example computing device that can be used to implement any of the methods, servers, entities, and computing devices described herein.

Having described an example communication network shown in FIG. 1 in which various features described herein may be implemented, an example computing device as shown in FIG. 2 will be described.

FIG. 2 illustrates general hardware elements that may be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television or monitor, or an integrated display), and may include one or more output device controllers 207, such as a video processor. There may also be one or more user input devices 208, such as a remote control, keyboard, mouse, touch screen, microphone, camera for capturing images, video, and the like. One or more input devices 208 may be integrated within the computing device 200. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity may be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
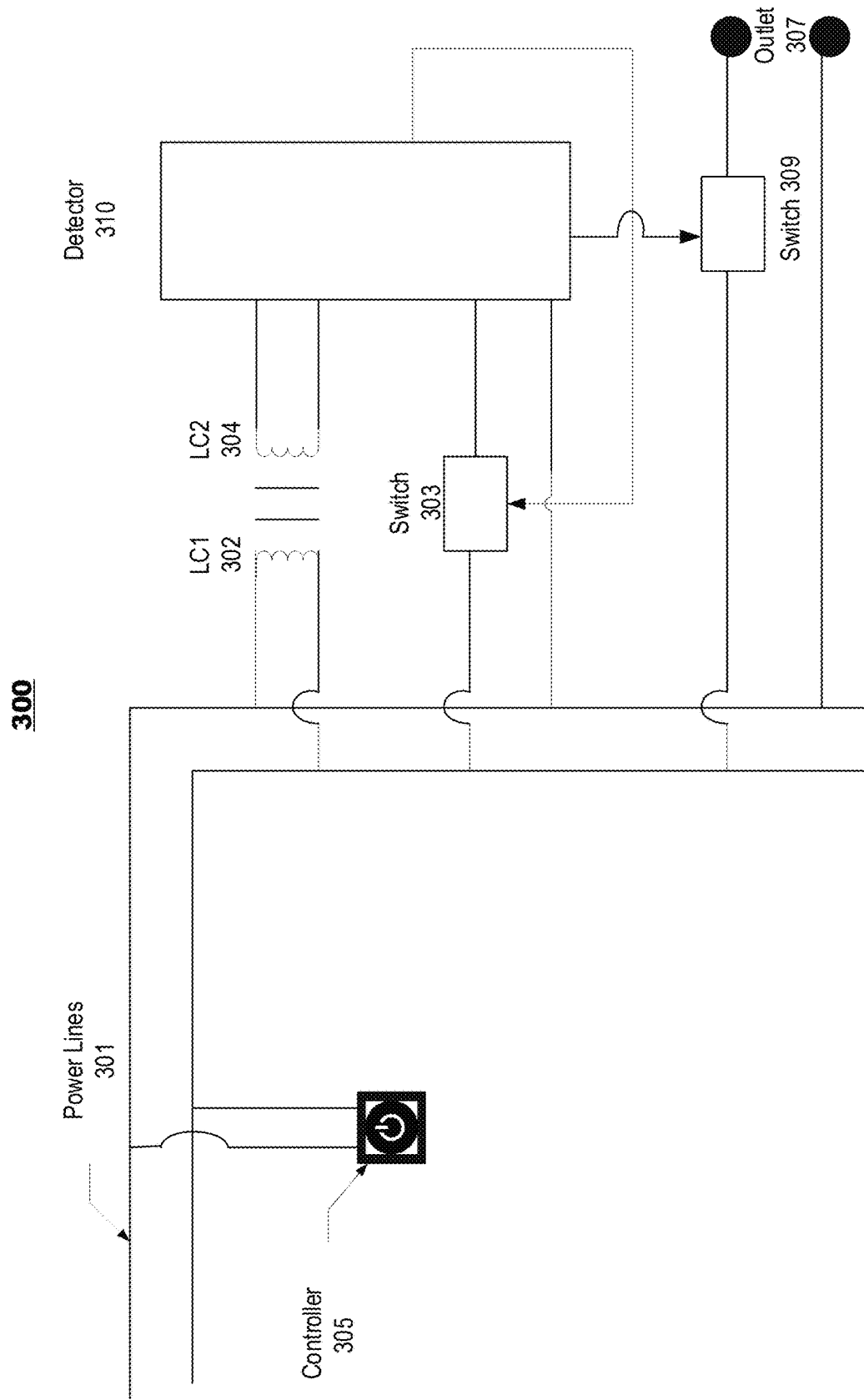
FIG. 3 depicts an illustrative diagram showing aspects of devices described herein.

FIG. 3 depicts an illustrative diagram of components which may be used according to one or more aspects of the present disclosure. As depicted, a controller 305 may be coupled via wires to power lines 301. The controller 305 may receive signals transmitted via wires (e.g., the power lines 301 or other wires not depicted in FIG. 3) or wirelessly (e.g., via a wireless interface). The controller 305 may transmit a signal which may be received at a detector 310. This signal may be transmitted via a wired interface (e.g., via lines such as the power lines 301) and/or wirelessly. Resonant coupling, for example, may be used to transmit the signal wirelessly. As an example, the controller 305 may cause tuned LC circuit 302 to be loaded, causing a primary coil of LC circuit 302 to resonate at a frequency, generating an oscillating magnetic field. A secondary coil of a second LC circuit 304 may also oscillate responsive to the magnetic resonance of the primary coil, resulting in a generated electrical current induced in the LC circuit 304. This generated current may provide "bootstrap" power to the detector 310. Additionally or alternatively, modulation of the generated electrical field (e.g., via control of the LC circuit 302 by the controller 305) may result in pulses appearing in the generated electrical current induced in the LC circuit 304. These pulses may provide a command, instructions, message, or the like to the detector 310. In some aspects, the resonant coupling may be a form of near field communication.

Once the detector 310 has received the power (e.g., via power lines, or via the wireless transfer of "bootstrap" power discussed above), generated electrical current may be stored in a capacitance or battery of the detector 310 (not shown). Additionally or alternatively the power may be directed to an enable or gate of a switch 303, which may cause the switch 303 to close or conduct power deliverable through the power lines 301. This may allow the detector 310 to process the message, information, or data in the transmitted signal and/or decode the message, command, and/or instructions. For example, the detector 310 may require a greater amount of power than is possible to transmit via resonant coupling. The detector 310 and the switches 303 and 309 may act as passive receivers and might not require battery or power. In some aspects, the controller 305 may act as the device that supplies the radio signal that will transmit and connect to the passive receivers (e.g., the detector 310, and the switches 303 and 309 and provide power to those devices.

In some aspects, the command and/or instruction received by the detector 310 may cause the detector 310 to enable or control a second switch 309. This control may cause, for example, the second switch 309 to close or conduct, thereby allowing for current to flow to a load attached to an outlet 307, thereby providing power to the load. The outlet 307 may be coupled to a plurality of devices. For example, outlet 307 may be coupled to one or more of the devices 112, 113, 114, 115, 116, and 117. In some aspects, there may be multiple outlets 307.

Figure 4A:
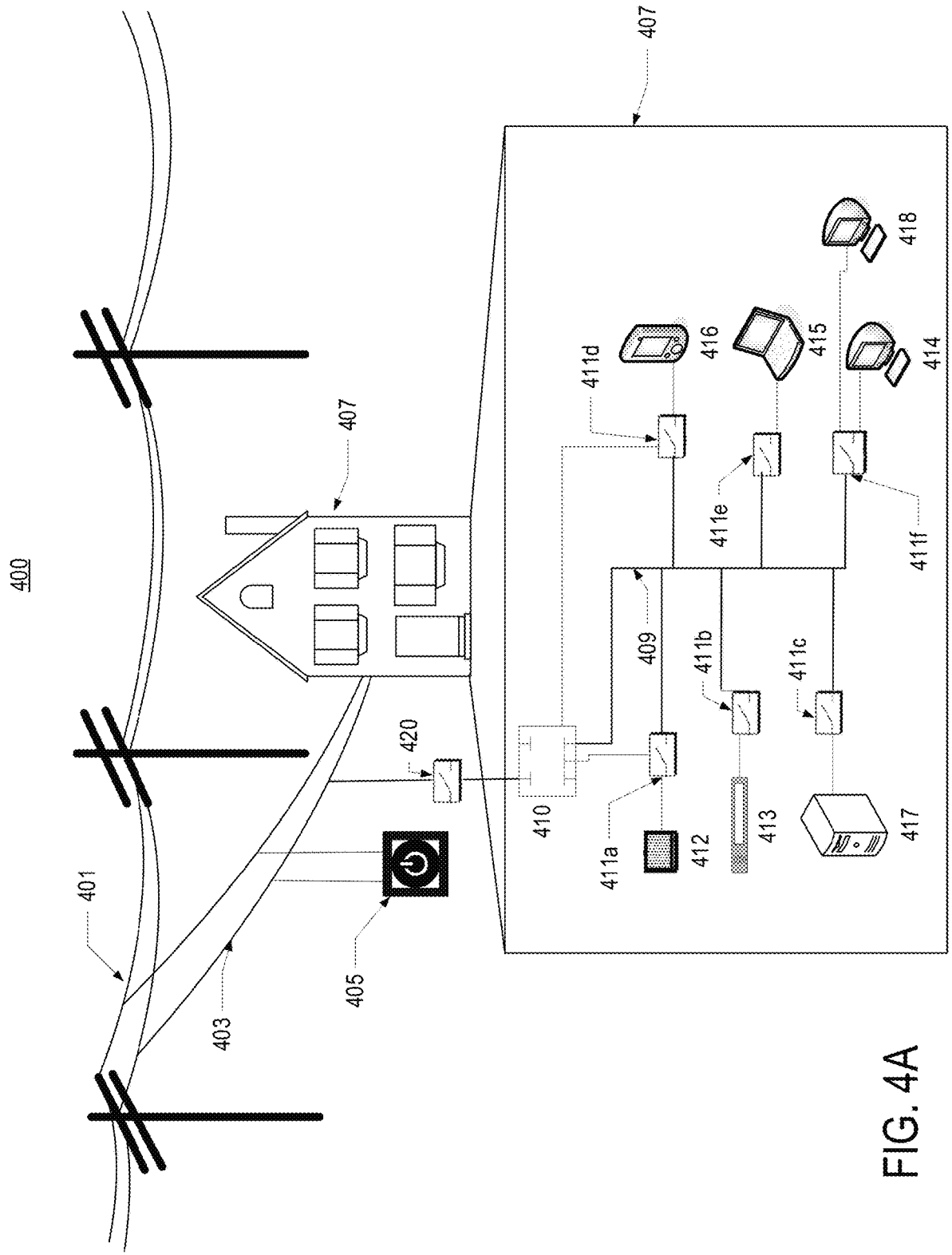
FIG. 4A depicts an illustrative environment in which various features described herein may be used.

FIG. 4A illustrates an example environment according to one or more aspects of the present disclosure. The depicted environment may include a power and/or information distribution network. As illustrated in FIG. 4A, environment 400 may comprise a network supporting connections to one or more computer devices, consumer premises equipment, controllers, detectors, and/or switches such as client devices 412, 413, 414, 415, 416, 417 and/or 418, detector 410, controller 405, and switches 411a-f and switch 420. Each computing device, consumer premises equipment, controller, detector, and/or switch of a premises, such as premises 407, may be powered via power provided by main power lines 401 and premises transmission power lines 403. Main power lines 401 and/or premises transmission power lines 403 provide alternating current (AC) or direct current (DC) power to a premise.

Client devices 412, 413, 414, 415, 416, 417, and 418 include personal computers, mobile devices, laptop computers, and/or tablets, and may include the devices 112-117 discussed in reference to FIG. 1). The client devices 412-417 may include one or more of the elements described above with respect to the computing device 200 (FIG. 2). Further, other client devices not depicted in FIG. 4A may include electrical devices such as appliances, circuit breakers or other power distribution equipment located within or about the premises 407, or the like. For example, client devices may include washers, dryers, refrigerators, stoves, microwave ovens, electric clocks, electric lights or lighting fixtures, consumption devices such as televisions, fixed-medium-based content players (e.g., Blu-Ray players DVD players, VHS players, or the like), network-based content players (e.g., devices which receive content via a wired or wireless network), security systems, wall outlets, power banks, power distribution boxes, or combinations of the above or other like devices. Premises 407 may comprise a house, home, apartment, condo, hotel, business, school, office, store, or any structure designed to have electrical outlets so that devices may be hooked up, plugged in, or powered via power signals received at the premises. The environment 400 may include a controller 405, which may control the provisioning of power to the one or more client devices 412-418 and may comprise the features or components discussed above with respect to controller 305 of FIG. 3. The controller 405 may be coupled to the power lines 401 and/or the premises transmission power lines 403, and may be at a location at or in the immediate vicinity of the premises 407, or in some aspects may be located at a location relatively remote from the premises (e.g., at a network head-end, at a power generating facility, or the like). The controller 405 may communicate with one or more other devices, systems, components or the like, including, for example, the devices and servers of office 103. Other entities, such as devices and systems of a power operator (e.g., power company, power utility) may communicate with the controller 405. The controller 405 may be configured to receive signals from a user or users associated with a premises, for example signals communicated via one or more of the networks and/or network elements discussed above. These signals may include, for example, signals transmitted responsive to operation of a mobile device, computing device, network device, or the like. In some aspects, signals transmitted to the controller 405 may be generated by a device or devices responsive to other signals transmitted or received in the system. For example, a user or users may operate an application running on a mobile device to input a request for a DVR to record a television program. Multiple communicative signals, messages, instructions, or the like may be generated responsive to such input, including a communication transmitted to the controller 405 and a communication transmitted to a different system or device (e.g., a device of the office 103 for recordation that the user desires to record the television programming).

In some aspects, the controller may receive a signal, or an indication of a signal, which is ultimately directed to a power-consumption device. The controller 405 may cause the signal to be modified or transmission of a signal to the power-consumption device to be postponed, delayed, canceled, or the like. For example, the controller 405 may determine that an instruction message is to be transmitted to a DVR instructing the DVR to record a television program. It may be that only one instruction message will be transmitted to the DVR. Therefore, the controller 405 may cause the instruction message to be delayed, for example to ensure that the DVR is powered (e.g., by the controller 405 causing one or more switches to be closed such that the DVR becomes powered).

In some aspects, the controller 405 may be configured to transmit a signal via resonant coupling. The controller 405 may include one or more components configured to oscillate at a resonant frequency, such as a magnetic coil coupled to a capacitance, and/or generate a radio frequency (RF) signal. As discussed above with respect to the system of FIG. 3, power may be transferred via wires or wirelessly from components of the controller 405 to components of the detector 410. In some aspects, the detector 410 may operate to process a message or information in the signal sent by the controller 405, and may decode the message, information, commands, instructions, or the like located within the signal.

In some aspects, the detector 410 may have non-volatile memory, which can store information for future use. In some aspects, a component or components the detector 410 may activate a switch 420, thereby allowing power from the main power lines 401 or the premises transmission lines 403 to be received at the detector 410. In some aspects, the detector 410 may activate one or more switches 411. In some aspects, the detector 410 can receive a control signal (from, e.g., the controller 405) and generate and transmit separate control signals (to, e.g., the switches 411).

In some aspects, one or more detectors 410 may be co-located with one or more of the switches 411. In some embodiments, the functions of the detector 410 may be encompassed and executed by one or more of the switches 411. In some embodiments detector 410 is located in, on, or near the premises 407. In some embodiments, detector 410 may be located remotely from the premises 407.

Environment 400 may include switches 411*a-f*. Each of the switches 411 may be any switch, gate, transistor, thyristor, or relay. In some embodiments, the switches 411 may be electrical switches. In some aspects, the switches 411 may be an electrical component that can break and/or supply an electrical circuit, interrupting the current or diverting it from one conductor to another. In some aspects, the switches 411 may be a relay which may be electrically operated. In some aspects, the switches 411 may be a relay that uses an electromagnet to mechanically operate a switch or may be a solid state relay. In some embodiments, the switches 411 may be a thyristor and act as a bi-stable switch, conducting when its gate receives a current trigger, and may continue to conduct while it is forward-biased. In some embodiments, the switches 411 may be a gate (e.g., insulated-gate bipolar transistor (IGBT), metal oxide semiconductor field-effect transistor (MOSFET), field-effect transistor (FET), transistor, operation amplifier, and/or amplifier. In some environments one or more different types of switches, gates, relays, thyristors, transistors, and so on may be used (e.g., the switches 411 might not be all gates or all thyristors). In some aspects a switch may be configured to provide power to multiple devices, either as a group (e.g., power is supplied to both of the devices 414 and 418 at the same time) or individually (e.g., power is supplied to none, one or both of the devices 414 and 418. In some aspects, the switches 411 may include components or computing devices, such as network interfaces, that may connect devices together on a data network as well as on an electrical network.

The switches 411 may communicate with one or more of the controller 405 and the detector 410. Each switch 411*a-f* may be configured to transmit and receive signals, including power signals and control signals. For example, the controller 405 and/or the detector 410 may transmit a signal to one or more of the switches 411*a-f*. The signal transmitted by the controller 405 and/or the detector 410 may provide power to the switches 411*a-f* and may also provide commands and/or instructions to the switches 411*a-f*. These signals may be transmitted via, for example, a common bus 409, or may be transmitted via direct links as illustrated with respect to the switches 411*a* and 411*d*. In some aspects, the switches may be powered via their connection to, for example, the premises wiring and may only receive control or enable signals. A power signal providing the switches 411*a-f* power to perform determinations might not be necessary or might not be transmitted to the switches from the controller 405 and/or detector 410. In some embodiments, a switch 411*a-f* and detector 410 may be bundled together into one device having components operating to perform the functionality described above.

Commands or instructions may control the switches 411a-f to provide power to the client devices 412-418. In some aspects, the commands or instructions may be directed to a single switch 411a-f (e.g., 411a or 411e) to provide power to a single client device (e.g., the client device 412 or the client device 415). In some aspects, the commands or instructions may be directed to a single switch to enable power to multiple devices (e.g., the switch 411f and the client devices 414 and 418). In some aspects, the commands or instructions may be directed to multiple switches (e.g., the switches 411a and 411f may receive the same or similar commands and/or instructions to power the client device 412 and one or both of the client devices 414 and 418).

In some aspects, the command or instructions may be transmitted from the controller 405 to a first switch (e.g., the switch 411a), and the first switch may determine the command instruction is applicable to a second (e.g., the switch 411f). In some aspects, the command passed from the controller 405 to the second switch might not be applicable or controlling of the first switch. As discussed above, in some aspects, commands or instructions may be generated responsive to messages or signals indicative of a request or instruction entered by a user.

In some aspects, the controller 405 may be triggered to transfer power to the detector 410 and/or to cause one or more of the switches 411 to close, open, conduct, or terminate conducting based on device settings of one or more the client devices. For example, a client device may have a setting responsive to input from a user or other entity that the client device requires power at a particular time of day, week, month, or the like (e.g., every 90 minutes, every third Sunday, once a minute, on July 30th and October 7th from 6:00 am to 6:30 am, and so on). A client setting may be communicated to the controller 405 (or other system, device, component, or the like) in advance of the time where power is requested and stored in memory at the controller or other device, component, system, and so on. For example, a computing device may seek to download maintenance updates to improve operation, reduce likelihood of exploitation by malicious software (e.g., patches). The computing device may desire to download these updates on a predetermined or user-set schedule of every ten days. The computing device may communicate this request to the controller 405. On the scheduled day, the controller may cause one or more switches to close or conduct, causing the connection of the computing device to the power grid (e.g., the controller may close a switch connecting the main power lines 401 to the premises transmission power lines 403, a switch connecting the internal wiring of premises 407 to the power outlet at which the computing device is plugged in, and/or a switch in a wire connecting the power outlet with the computing device). In some aspects, a manufacturer, operator, seller, retailer, third-party, or other individual or organization may indicate such device settings to the controller.

The network connections depicted in FIG. 4A are illustrative and other means of establishing a communications link between devices may be utilized. The client devices 312-318 may be mobile terminals (e.g., mobile phones, smartphones, personal digital assistants (PDAs), notebooks, or the like) and may include various other components, such as batteries, speakers, antennas, and so on, (not shown) and may be connectable to a power source (e.g., via a plug, power adapter, cable, or the like) (not shown). Additionally or alternatively, the client devices 312-318 may be devices capable of and/or configured to establish a network connection, such as a network thermostat, network security system, and the like.

Figure 4B:
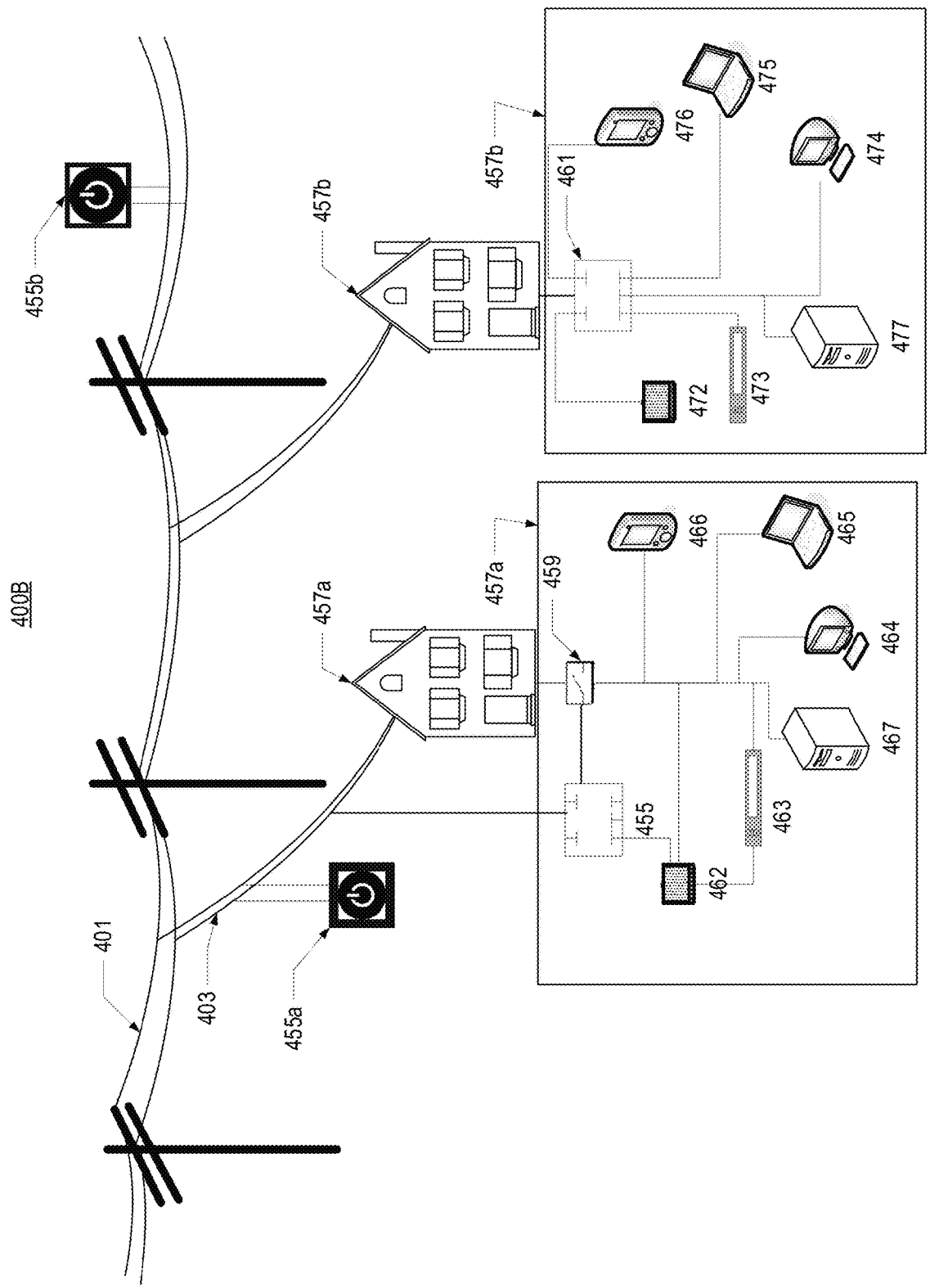
FIG. 4B depicts another illustrative environment in which various features described herein may be used.

FIG. 4B depicts additional or alternative environment of the present disclosure in accordance with one or more aspects described herein. Environment 400B includes main power lines 401, premises transmission power lines 403, multiple premises 457a and 457b, controllers 455a and 455b, detectors 410 and 455, master power switches 459 and 461 and client devices 462-467 and 472-477 (which may be, for example, devices 112-117, respectively, discussed above). These components of environment 400B may operate in a similar manner to respective counterparts described above, and/or in additional or alternative manners as provided below.

In some aspects, the client devices 462-467 and 472-477 may consume zero power in a depowered or off state. As illustrated in FIG. 4B, a client device (e.g., device 462) may be located at a premises (e.g., premises 457a) of a first user or subscriber, while another client device (e.g., device 472) may be located at a premises (e.g., premises 457b) of a second user or subscriber. In some aspects, each premise may have any combination of client devices. For example, premise 457a may comprise a single device 462, and premise 457b may comprise devices 472, 473, and 477. In some aspects, there may be multiple (more than shown) premises within environment 400B.

A master power switch 459 may be located on or within premises 407a, and a second master power switch/detector 461 may be located on or within premises 457b. The master power switch 459 may receive a signal transmitted from either controller 455a and/or controller 455b. Additionally or alternatively, the master power switch 459 may receive a signal transmitted from a detector 455. The signal may contain power and a command and/or instructions. In response to receiving the instructions the master power switch 459 may provide a signal containing power and a command and/or instructions to smart power outlets into which one or more 462-467 are plugged or electrically coupled. In some aspects, the master power switch 459 may only transmit a signal to one of the smart power outlets driving devices 462-467. In some aspects, the master power switch 459 may transmit a signal to multiple power outlets driving devices 462-467. As may be seen with reference to FIG. 4B, a master power switch may comprise a detector, such as the master power switch/detector 461. The master power switch 461 may receive a signal transmitted from either controller 455a and/or controller 455b. The signal may contain power and a command and/or instructions. In response to receiving the instructions the master power switch 459 may provide a signal containing power and/or a command and/or instructions to smart power outlets into which one or more of the client devices 472-476 are plugged or electrically coupled.

Figure 5:
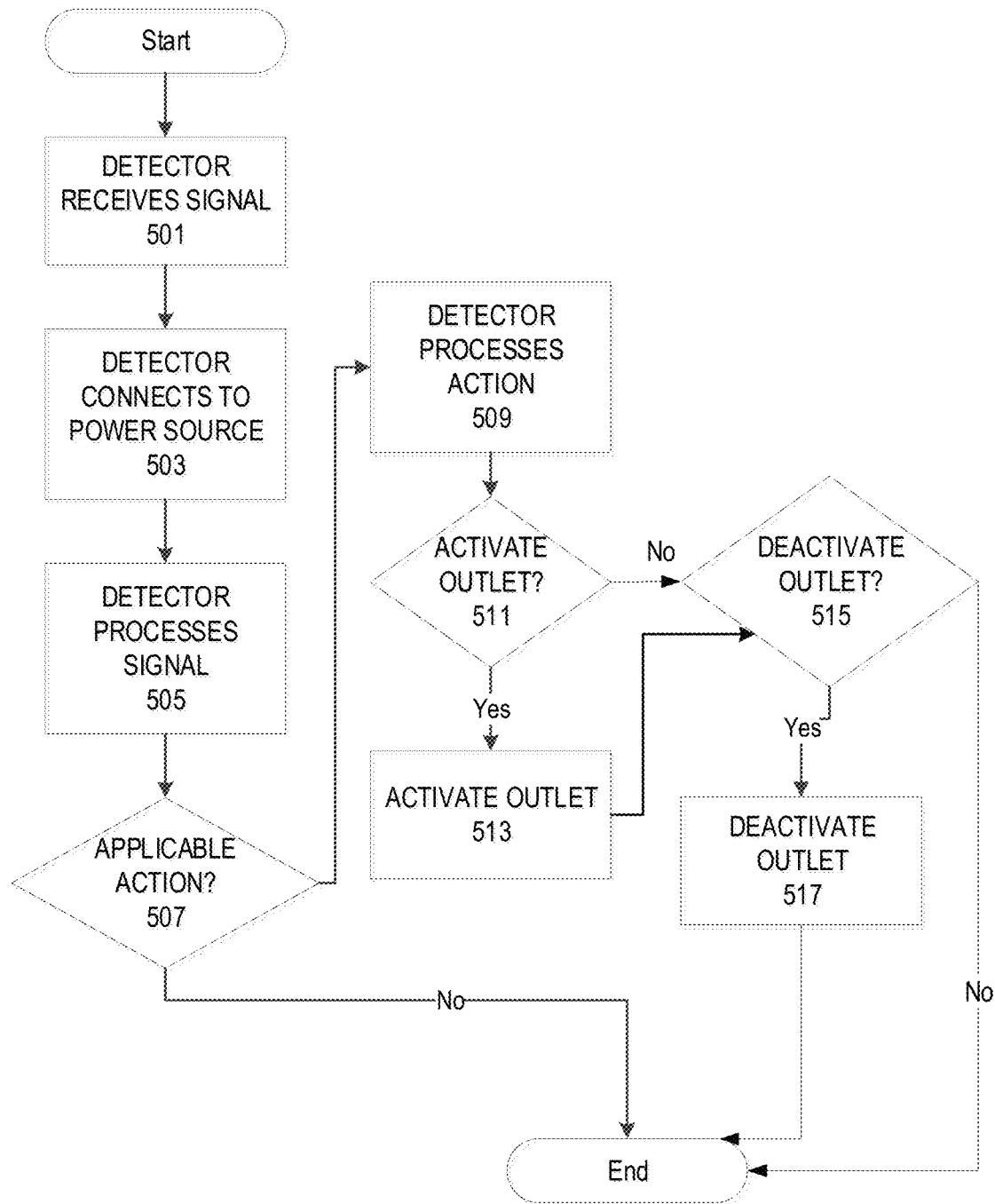
FIG. 5 depicts a flowchart that illustrates a method of controlling provisioning of power to a power-consumption device in accordance with one or more illustrative aspects discussed herein.

FIG. 5 depicts an exemplary method of controlling power to one or more power-consumption devices according to one or more aspects described herein. At step 501, a detector may receive a signal, e.g., a signal transmitted by a controller (e.g., the controller 305, the controller 405, the controller 455a, the controller 455b). As discussed above, the signal may comprise a command and/or instructions, and may be transmitted via oscillation of a component at its resonant frequency to generate an oscillating magnetic field. As such, the transmission of the signal may result the reception of transferred power at the detector device (e.g., a standalone detector, such as the detector 455, or a switch comprising a detector, such as the master power switch 461) via generation of an electrical current in a tuned circuit of the detector.

The signal may contain information or data such as a command and/or instructions. In some aspects, the signal may be a radio signal.

At step 505, the "bootstrap" power received by the detector may enable the detector to connect a power source to the detector. As discussed above, this may be that the "bootstrap" power received by the detector actuates a first switch so that the first switch closes or conducts electrical current to provide power to the detector. At step 505, the detector may process and/or decode the signal. For example, the detector may apply one or more filters to determine informational content carried by the signal. As discussed above, the informational contents may be stored in a memory, such as a non-volatile memory local to the detector.

At step 507, the detector may perform a determination as to the applicability of the informational contents of the signal to the detector and one or more power-consuming devices which may be powered by the detector. For example, the informational contents of the signal may include an identifier which may identify the detector device and/or one of the power-consuming devices. As an example, the identifier may indicate a switch communicatively coupled to the detector or may indicate a logical address or network address of the detector or a power-consumption device (e.g., "actuate switch 3," "empower device XXX.YY.ZZZ.AA," "empower devices XYZ1 and ABC2.") If the detector determines there is no applicable action (e.g., NO branch from step 507), the process may end (e.g., the detector may return to a listening state for signals and/or may cause the first switch actuated at step 503 to disconnect, toggle, or become non-conductive).

If there are one or more applicable actions (e.g., YES branch from step 507) then at step 509, the detector may process the one or more actions. For example, this may include identifying a type of instruction included in the informational content and the detector may determine the applicability of the instruction to one or more power-consumption devices that may be powered by the detector. For example, the informational content may include an instruction for a DVR to record a television program, and the detector may determine that there are one or more DVRs which could be powered by operation of the detector (e.g., the detector could activate an outlet or otherwise provide power to one or more DVRs). The detector may make a determination to empower one or more of the DVR devices based on information in the instruction or other information known or available to the detector (e.g., one DVR is already recording or scheduled to record a program, the available free space of one DVR exceeds the free space estimated to be needed to record the program, one DVR may record high-definition content, one DVR is a network-capable or "multi-room" DVR, and so on). The detector may make a determination not to empower one or more devices based on the instructions, such as a lighting fixture or computing device lacking recording capabilities.

At step 511, the detector may determine whether one or more outlets may need to be activated or powered. This may be based on determining one or more devices to be powered at step 509. The detector may determine, for example, that a power-consumption device which is to be powered is already powered, either via a signal received from the outlet providing power to the power-consumption device is already enabled, activated, powered, or the like. As another example, the detector may know (e.g., retrieve from a non-volatile memory) that the power-consumption device is activated (e.g., because the detector has previously activated or powered the power-consumption device). At step 513, the one or more outlets may be activated by transmission of a signal to the one or more outlets to enable or control the toggling of a switch, gate, relay, transistor, thyristor, or the like. Based on such, power may be provisioned to the power-consumption device.

If the instruction does not indicate that a power outlet should be activated or powered (e.g., NO branch from step 511), then at step 515 the detector may determine if one or more power outlets and/or power-consumption devices should be deactivated. For example, the instruction or information in the signal received at the detector may indicate that a device is to be depowered or deactivated (e.g., a powered device does not need to be powered at this point in time.) Additionally or alternatively, the detector may proceed to step 513 after activating or empowering a power outlet at step 513. For example, the detector may determine that the instruction to activate an outlet and/or power-consumption device for a period of time, and may instantiate a timer, or record the time at which the outlet/device was powered for comparison purposes. At the end of the timer, or when the timer exceeds a value, or when a period between the empowerment time and the present time exceeds a value, or the like, the detector may determine that depowering the device is appropriate or desirable. For example, the instruction may indicate that a DVR is to record a one-hour-long program, and the DVR may be powered shortly before the program is to be transmitted (e.g., to provide adequate time for the DVR to boot-up and prepare for the recording). At the end of the one-hour-program (plus the boot-up time period), the detector may determine it is desirable to depower the DVR (after an adequate period of time for the program to be stored in a storage medium associated with the DVR).

In some aspects, the determining at step 515 may include transmitting a signal to the outlet and/or to the power-consumption device to determine if the power-consumption device may be depowered, and the detector may receive a signal from the outlet or the power-consumption device indicating that it is "safe" or "acceptable" for the power-consumption device to be depowered. In some aspects, the detector may periodically or at predetermined times perform this polling or querying to determine what power-consumption devices may be depowered. Determining whether to depower a device may include transmitting/receiving other signals from other devices present at the premises or from which information may be accessible. For example, the detector may receive a signal from a motion detector indicating a lack of activity in a room in which a television and a DVR are presently powered. The detector may transmit a signal to an output device to display on the television indicating to any viewers that the device will be depowered shortly unless an override command is received. The detector may receive a signal from the DVR that the DVR is recording a program, and that the DVR should not be depowered.

At step 517, the detector may deactivate or depower any outlets and/or power-consumption devices as determined at step 515. As discussed above, this may include transmitting a signal to one or more outlets to depower, toggle, actuate, break connection, cease enabling, or become non-conductive a gate, relay, transistor, thyristor, or the like. If no outlets or devices should be depowered (e.g., NO branch from step 515) the process may end. The detector may return to a listening state and/or a depowered state by toggling, actuating, decoupling, and so on the switch actuated at step 503. In some aspects, the listening state and/or depowered state may result in zero consumption of energy or power, or minimal consumption of energy and power which may result from parasitic or leak currents. These parasitic or leak currents may result, for example, from unavoidable imperfections of insulators, physical properties of materials, or the like.

Figure 6:
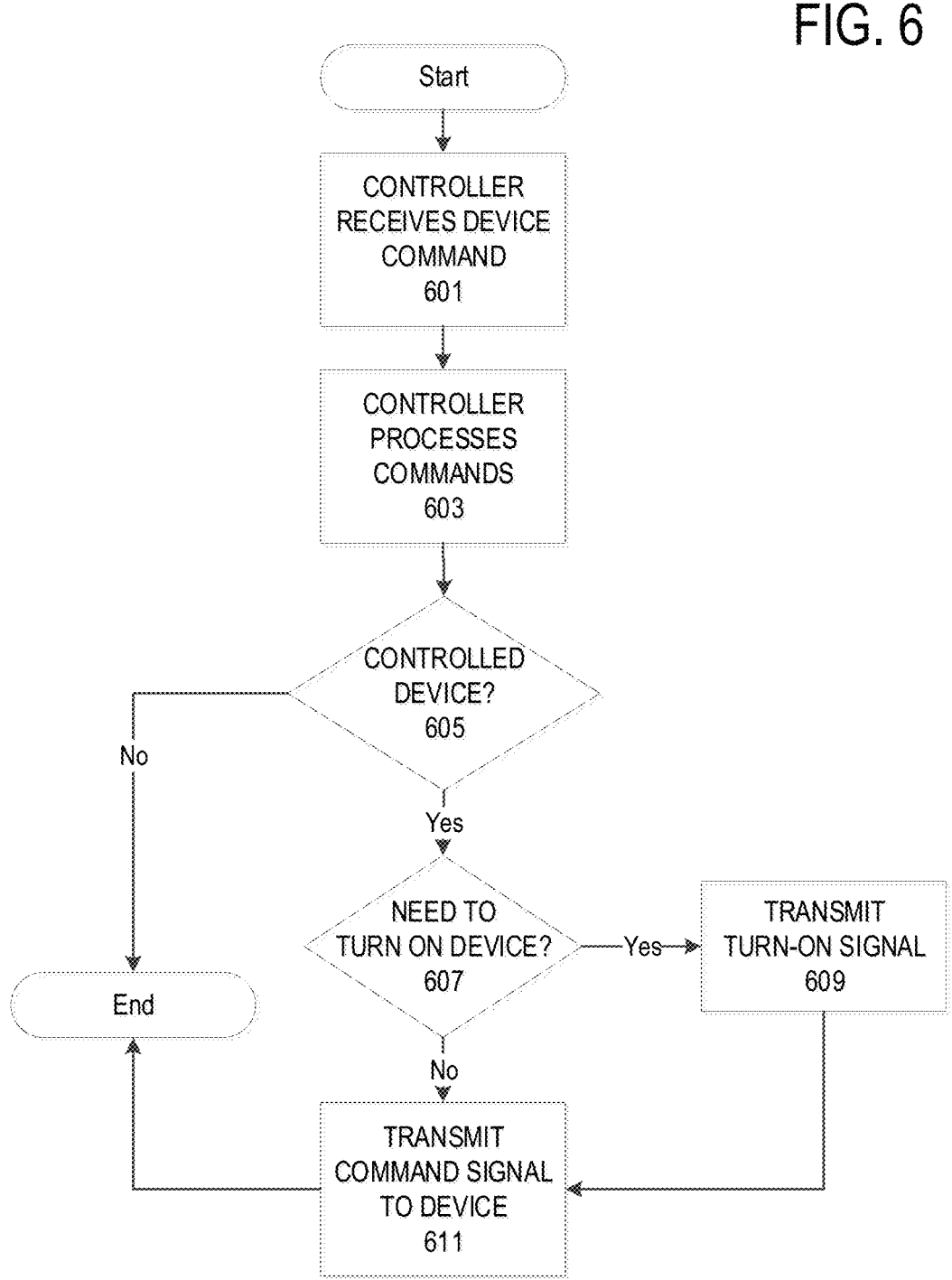
FIG. 6 depicts another flowchart that illustrates a method of controlling provisioning of power to a power-consumption device in accordance with one or more illustrative aspects discussed herein.

FIG. 6 depicts another illustrative method for controlling the provisioning of power to one or more power-consumption devices, according to one or more aspects described herein. At step 601, the controller may receive a command applicable to one or more power-consumption devices. For example, this command may be received from the power-consumption device itself (e.g., the request or instructions to ensure that the power-consumption device is powered at a set time or for a certain time period). Additionally or alternatively, this command may be received from another device, system, component, and so on (e.g., the one or more computing devices of the local office 103, a mobile device associated with the controller, and so on.)

At step 603, the controller may process the commands received at step 601. For example, the command may be in the form of a request for a device to be powered. Additionally or alternatively, the command may be in the form of a request for a device to perform an action, and the controller may process the command to determine the device of which the action is requested. At step 605, the controller may determine the applicability of one or more received commands to one or more detectors, power-consumption devices, outlets, users, and the like known to the controller. For example, the controller may determine the command indicates an identifier for one or more detectors which are controlled by the controller. As another example, the controller may determine the command indicates an identifier for one or more power-consumption devices, and the controller may determine one or more detectors which may be able to empower the power-consumption device. If the command does not indicate one or more power-consumption devices controllable by operation of the controller, or the controller determines that it cannot empower one or more power-consumption devices (e.g., NO branch from step 605), the process may end.

If the controller determines that one or more power-consumption devices are controlled by operation of the controller (e.g., YES branch from step 605), the controller may determine whether the one or more power-consumption devices are already powered. For example, the controller may transmit a signal requesting a status of the power-consumption device, or may retrieve the status from a memory. If the device is already powered (e.g., NO branch from step 607) the process may end. If the device is not already powered (e.g., YES branch from step 607), then at step 609, the controller may send a signal to activate or empower the device. For example, the controller may send a signal via resonant coupling to a detector comprising instructions to empower the device.

As discussed above, in some aspects the power-consumption device may need to be in a powered state before it is capable of receiving commands for actions. For example, the DVR may need to be powered before it can receive a request or instruction to record a television program. Therefore, in some aspects, the controller may wait for a predetermined period of time before sending a command (e.g., the command received at step 601, a generated command based on the received command, and so on) to the power-consumption device, or allowing the command to be sent to the device. The predetermined period of time may be specific to the power-consumption device or class of power-consumption devices. For example, a DVR may need one period of time to power and boot to a state where it is ready to receive commands (e.g., recording commands). An air conditioner controller may need a second period of time, different from the first period of time, to boot to a state where it is ready to receive commands (e.g., commands to raise or lower the temperature in a space). At step 611, after the period of time has elapsed at step 609, or if the power-consumption device is known to be in an powered state (e.g., YES branch from step 607), the controller may send, or allow to be sent, the command to the power-consumption device for further action to be taken by the power-consumption device.

Figure 7:
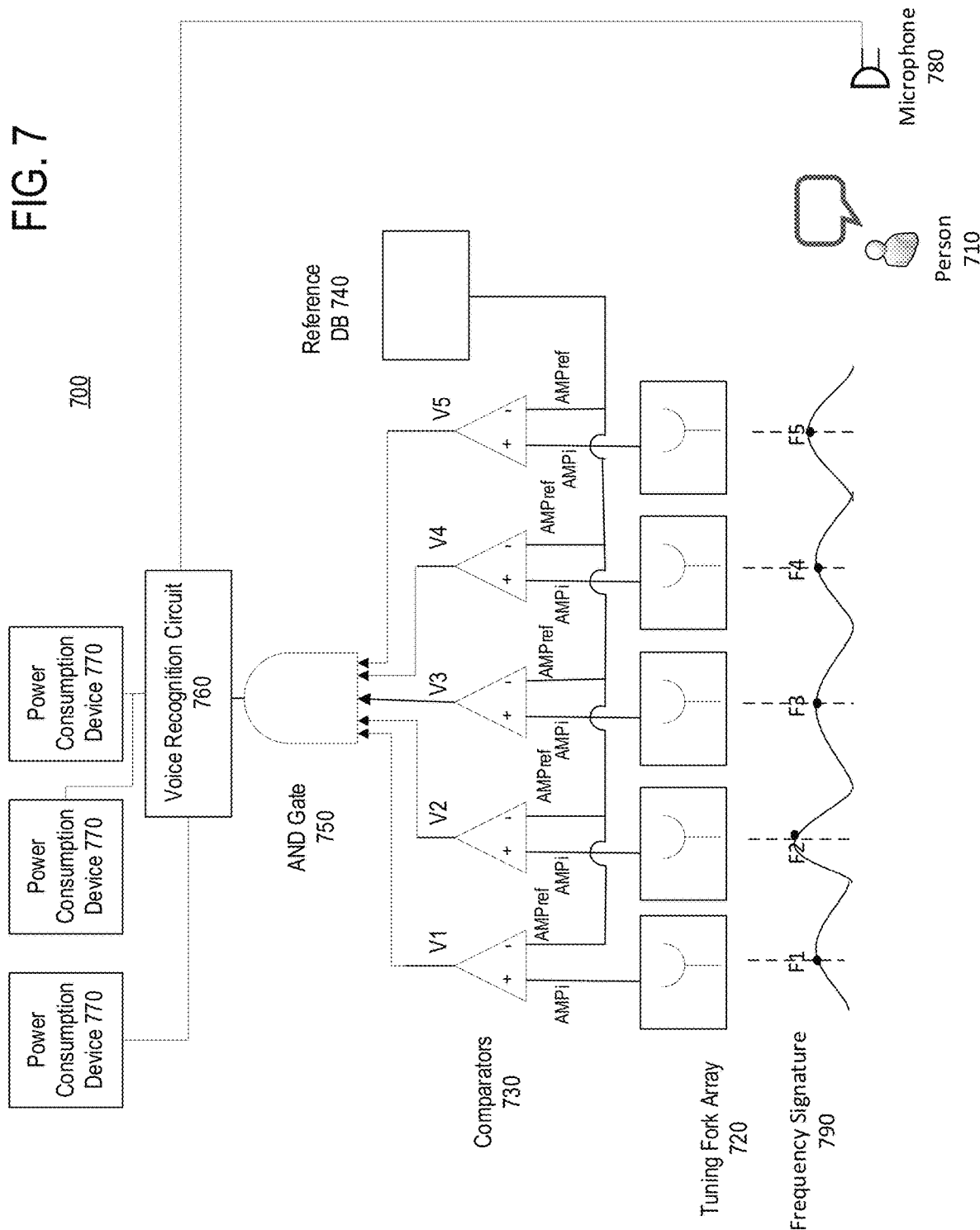
FIG. 7 depicts another illustrative diagram showing aspects of devices described herein.

FIG. 7 depicts an illustrative diagram of components which may be used according to one or more aspects of the present disclosure. The system 700 may comprise the computing devices or components discussed above with respect to FIGS. 1 and 2. As depicted, a person 710 may provide a voice input to a tuning fork array 720. The tuning fork array 720 may include one or more tuning forks that vibrate at certain frequencies in response to the voice input. As an example, the tuning fork array 720 may include a plurality of tuning forks that may span over a frequency spectrum of human voice speech. The voice input may generate a vibration amplitude corresponding to a frequency captured by a tuning fork. In an initial configuration process, a system including the tuning fork array 720 may prompt a user to speak in a configuration process. For example, a user may be prompted to read a text or an isolated vocabulary. The system including tuning fork away 720 may analyze the user's voice and recognize the user's speech. An amplitude at each frequency may be captured as a reference amplitude for a user and a collection of reference amplitudes at various frequencies may be recorded as a frequency signature of the user. For example, a user may speak with a vocal range of a baritone, and the frequency signature may include the reference amplitudes in the lower frequencies. Another user may speak with a vocal range of a soprano, and the frequency signature may include the corresponding reference amplitudes in the higher frequencies. The frequency signature for the user may be stored in a database such as reference database 740. The tuning fork array 720 illustrates, for example, five tuning forks in FIG. 7. In response to the voice input from a user, the five tuning forks may each vibrates at frequencies F1, F2, F3, F4 and F5 with different amplitudes, respectively. The vibrations of the tuning forks may generate a frequency signature 790. As illustrated in the frequency signature 790, each frequency may correspond to an amplitude, which may be stored in the reference database 740 as a reference amplitude. As a result of the configuration process, the system may store multiple different frequency signatures, corresponding to different users, in the reference database 740. The frequency signatures may be for any audio, such as a human voice, an electronic beep, a hand clap, an audio recording, or any other desired sound that the user wishes to use to wake a sleeping system.

The system may store one or more frequency signatures, and multiple frequency signatures may constitute a signature collection for a user. The amplitudes at a single set of frequencies, such as F1, F2, F3, F4 and F5 as noted above, may correspond to one frequency signature of the user. A signature collection may be collected based on time and may include one more such frequency signatures. An utterance of the user may be translated into multiple frequency signatures. A longer utterance may include a greater number of frequency signatures than a short utterance. For example, the user may issue a command "Xfinity, open the door." This command may correspond to, for example, four frequency signatures. This command may cause vibrations at 100 tuning forks, where the voice input in the command "o" may cause tuning forks 1-15 to vibrate, the voice input "pen" may cause tuning forks 7-20 to vibrate, the voice input "the" may cause tuning forks 50-70 to vibrate, the voice input "door" may cause tuning forks "20-40" to vibrate. These four frequency signatures may constitute a signature collection for the user and each signature collection may be a sequence of one or more reference signature values. A signature collection may be represented as SC1: (S0, S1, . . . , Sn−1), where each Si, for i=0 to n−1 may be a frequency signature generated at tuning fork array (V0 . . . Vm−1). The system may prompt the user to input a few sentences to calibrate the system and the signature collection of the user may be stored in the reference database 740.

After the configuration process, the frequency signatures or signature collections may be stored in the reference database 740. The system may process voice inputs from multiple users concurrently. For example, the system may receive utterances from user A and user B. The utterances may yield combined frequency signatures that match to multiple reference signatures. In this example, user A utters "record channel A for 50 minutes," while user B utters "I want to watch channel B." These two commands may be matched with a first signature collection that references user A and a second signature collection that references user B in the reference database 740. The commands may be processed concurrently or sequentially as determined by the configuration of the voice recognition circuit 760 as described below.

The tuning fork array 720 may be coupled to one or more comparators 730 and may transmit their vibrations to the comparators 730. Each comparator may receive a vibration amplitude AMPi, and a reference amplitude AMPref as inputs. The reference amplitude AMPref may be retrieved from the reference database 740. Each comparator may compare the vibration amplitude AMPi with the reference amplitude AMPref to generate an output, such as V1, V2 . . . V5. As an example, an output of value "1" may indicate a match (within a threshold amplitude range) between the vibration amplitude AMPi and the reference amplitude AMPref. An output of value "0" may indicate there is no match between the vibration amplitude AMPi and the reference amplitude AMPref.

The comparators 730 may be coupled to an AND gate 750, which in turn may be coupled to a voice recognition circuit 760. The AND gate 750 may activate the voice recognition circuit 760 when all (or enough) of the comparators 730 indicate a match between the user's voice input and the frequency signature from the reference database 740. For example, the AND gate 750 may receive the outputs V1-V5 from the comparators 730. The AND gate 750 may activate the voice recognition circuit 760 based on a determination, for example, that all outputs V1-V5 have a value of "1," indicating all vibration amplitudes match with the corresponding reference amplitudes in the frequency signature of a user. The AND gate 750 may activate the voice recognition circuit 760 based on a determination, that the number of comparators with an output value of "1" have reached a threshold value (e.g. 80%), indicating a majority of the vibration amplitudes match with the corresponding reference amplitudes in the frequency signature of a user. The AND gate 750 may not activate the voice recognition circuit 760 based on a determination, that one or more outputs V1-V5 have a value of "0," indicating a mismatch with the pre-stored frequency signature of the user. Although an AND gate 750 is illustrated, the system can be configured to activate the voice recognition circuit 760 with fewer than all comparators 730 indicating a match—a threshold quantity of the comparators 730 may be determined, and a match may be sufficient to activate the voice recognition circuit 760 if that threshold is satisfied.

The voice recognition circuit 760 may be coupled with power-consumption devices 770 via a wired or wireless network. The power-consumption devices 770 and/or the voice recognition circuit 760 may draw reduced current or no current in a sleep mode. For example, the voice recognition circuit 760 may be in a "sleep" mode and there may be no current or reduced current to the voice recognition circuit 760 and the power-consumption devices 770. The tuning fork array 720, the comparators 730 and the AND gate 750 may control the operation of the voice recognition circuit 760, for example, to cause voice recognition circuit 760 to be powered on when the turning fork array 720 detects a voice input from a user and her voice matches with the pre-stored frequency signature.

The voice recognition circuit 760 may be activated to receive voice input from microphone 780, and may control the operations of the power-consumption devices. The multi-purpose voice input may provide information to the voice recognition circuit, in the form of a message, instructions, commands, or the like to enable the voice recognition circuit 760 to perform an action on a power-consumption device. For example, voice recognition circuit 760 may react to a user's voice input "Xfinity, turn on the TV" and may process the command to provide operating power to a TV. The voice recognition circuit 760 may react to a user's voice input "Xfinity, start recording the Nationals game at 8 PM" and may proceed accordingly to activate a DVR at the appropriate time. The sound of the beginning portion of that input (e.g., the "Xfinity") may be sufficient to cause the activation of the voice recognition circuit 760, so that the voice recognition circuit 760 may activate in time to detect the rest of the input (e.g., "start recording . . . ") from the microphone 780. The function of the tuning fork array 720 may eliminate or minimize the possibility that a background noise or unauthorized person accidentally activates the voice recognition circuit 760 and/or the power-consumption devices 770.

The voice recognition circuit 760 may process the received commands concurrently. For example, user A may utter "record channel A for 50 minutes," while user B may utter "I want to watch channel B." These two commands may be processed concurrently or sequentially as determined by the configuration of the voice recognition circuit 760. These two commands may be processed concurrently. For example, a first processor in the voice recognition circuit 760 may process the command from user A, and a second processor in the voice recognition circuit 760 may process the command from user B. These two commands may be processed sequentially. For example, the voice recognition circuit 760 may store the command from user B in a memory and process the command from user A before the command from user B. The voice recognition circuit 760 may subsequently retrieve the command from user B from the memory and process it accordingly.

Figure 8:
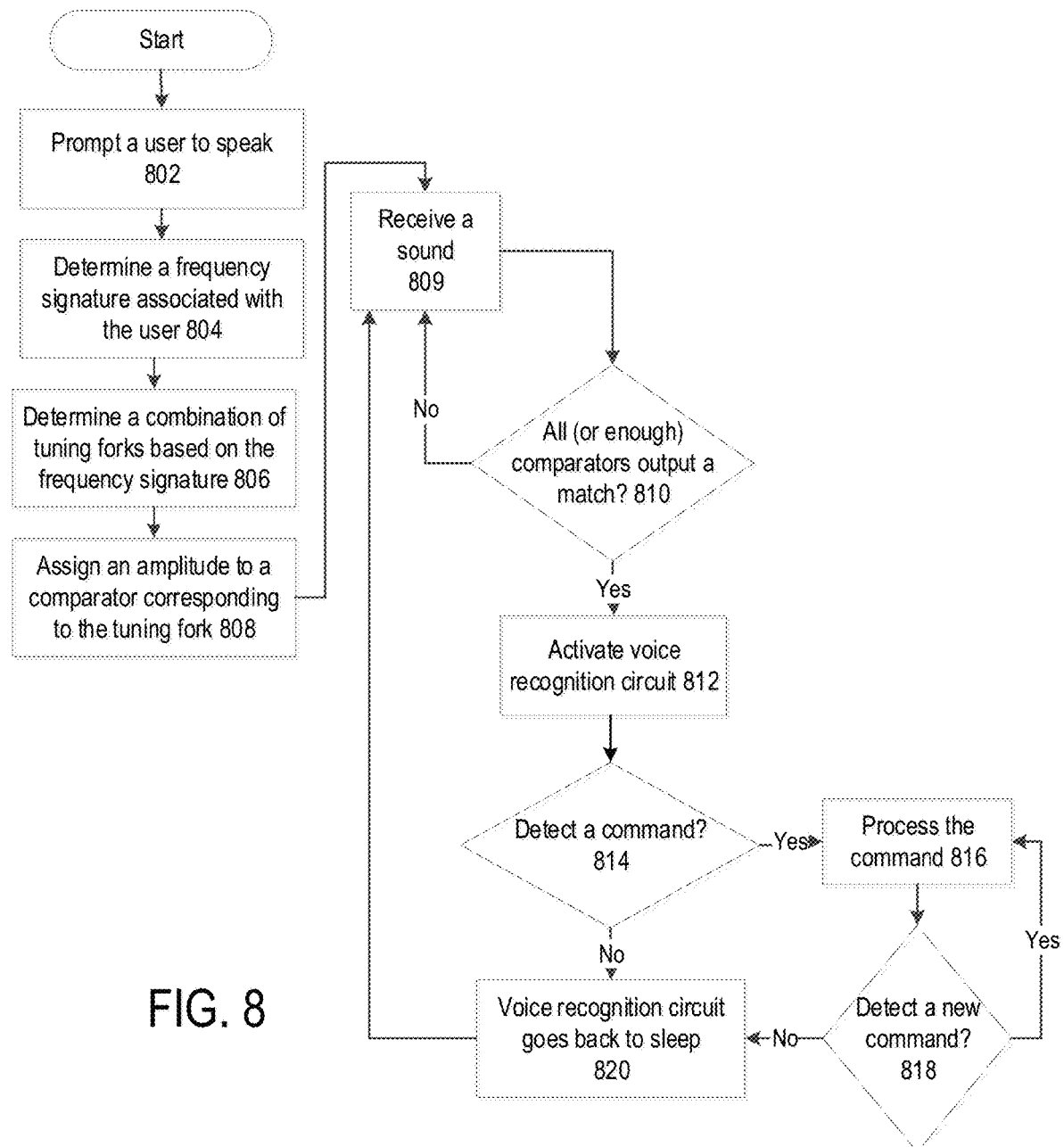
FIG. 8 depicts a flowchart that illustrates a method of controlling provisioning of power to a power-consumption device in accordance with one or more illustrative aspects discussed herein.

FIG. 8 depicts a method of activating a voice recognition circuit according to one or more aspects described herein. At step 802, the system (such as the system 700 in FIG. 7) may prompt a user to speak. The system may comprise one or more computing devices or components discussed above with respect to FIGS. 1 and 2. The system may initiate a configuration process and prompt a user to speak randomly, or read vocabularies or paragraphs from a script. The voice input may cause each tuning fork to vibrate and generate a vibration amplitude corresponding to a frequency captured by the tuning fork. At step 804, a frequency signature, associated with the user, may be determined. The speaker's voice may be analyzed and a frequency that the voice vibrates at each tuning fork may be determined. The voiced speech of a typical adult male may have a fundamental frequency from 85 to 180 Hz, and the fundamental frequency of a typical adult female may be from 165 to 255 Hz. For example, the tuning fork array may include 20 tuning forks. In response to the voice of a first speaker who is a male, a vibration may be generated at 12 tuning forks (e.g. tuning fork 1-10, 12 and 14). In response to the voice of a second speaker who is a female, a vibration may be generated at 10 tuning forks (e.g. tuning fork 9-10, 12-15 and 17-20). An amplitude at each frequency may be captured at the corresponding tuning fork as a reference amplitude for that speaker. A collection of reference amplitudes at various frequencies may be recorded in the reference database 740 as a frequency signature of the speaker's voice.

At step 806, a combination of tuning may be determined for the user. For example, for the first speaker, tuning forks 1-10, 12 and 14 may vibrate in response to the first speaker's voice and the vibration frequencies of tuning forks 1-10, 12 and 14 may be determined, respectively. The vibration frequencies (e.g. F1-10, F12 and F14) of the tuning forks 1-10, 12 and 14 may be recorded and these frequencies may be associated with the first speaker. Likewise, tuning forks 9-10, 12-15 and 17-20 may vibrate in response to the second speaker's voice and the vibration frequencies of for tuning forks 9-10, 12-15 and 17-20 may be determined, respectively. The vibration frequencies (e.g. F9-10, F12-15 and F17-20) of the tuning forks 9-10, 12-15 and 17-20 may be recorded and these frequencies may be associated with the second speaker.

In the configuration process, one or more comparators 730 may be configured to listen to all the tuning forks in the tuning fork array 720. One or more comparators 730 may be configured to listen to a subset of the tuning forks in the tuning fork array 720. The system may be configured to respond to certain users, for example, the first user, and the comparators 730 may be configured to listen to tuning forks 1-10, 12 and 14. The comparators 730 may listen to the tuning forks 9-10, 12-15 and 17-20 for the second user.

At step 808, an amplitude may be assigned to a comparator based on the frequency signature. The system may assign a comparator to each of the tuning fork in the tuning fork array. For example, a tuning fork array may have 20 tuning forks, and the system may assign a comparator to each of the 20 tuning forks, respectively. The system may assign a corresponding reference amplitude to each of the tuning fork associated with a speaker's frequency signature. These reference amplitudes (e.g. AMPref 1-20) associated with a speaker may be stored in the reference database 740. For example, if a particular user's voice results in a vibration at a first frequency F1, then the frequency signature in the reference database 740 may indicate that a reference amplitude for F1 is 1; if a particular user's voice results in no vibration at a first frequency F1, then the frequency signature in the reference database 740 may indicate that a reference amplitude for F1 is 0. In another example, if a particular user's voice results in an Amplitude AMP1 at a first frequency F1, then the frequency signature in the reference database 740 may indicate that a reference amplitude for F1 is AMP1. After the signature(s) are stored, the system may be ready to determine whether a future voice input matches with a previously stored frequency signature.

At step 809, the system may receive a sound (e.g. a voice input, or a non-voice input such as a an electronic beep, a hand clap, an audio recording, or any other desired sound that the user wishes to use to wake a sleeping system), and the comparators 730 may each determine whether there is a particular match between the comparator's tuning fork vibration and corresponding reference amplitude.

At step 810, a determination may be made on whether all (or enough) comparators output a match. The comparator 730 may compare a vibration amplitude of the sound with a previously stored reference amplitude. The sound may generate a vibration in certain tuning forks. The system may measure the vibration amplitude generated at each of the tuning forks. For example, the voice input may generate various vibration amplitudes (AMP1-10, AMP12 and AMP14) at frequencies F1-10, F12 and F14, which correspond to tuning forks 1-10, 12 and 14. The voice input may generate no vibration (AMP11, AMP 13 and AMP15-20 all equal to zero) at frequencies F11, F13 and F15-20, which correspond to tuning forks 11, 13 and 15-20. The system may retrieve the reference amplitudes (e.g. AMPref 1-20) from the reference database. The comparators may compare the vibration amplitudes (e.g. AMP1-20) with the reference amplitudes (e.g. AMPref1-20). The system may determine, for example, the vibration amplitudes AMP1-10, AMP12 and AMP14 match with the references amplitudes AMPref1-10, AMPref12 and AMPref14) at frequencies F1-10, F12 and F14, and the voice input generates no vibration (AMP11, AMP 13 and AMP15-20 all equal to zero) at frequencies F11, F13 and F15-20. In this example, the system may determine that all comparators output a match with the pre-stored frequency signature of speaker 1. If it is determined that not all comparators generate a match (step 810=No), the process may return to step 809 to receive a sound. Although the example above shows all comparators having a match, any desired quantity of the comparators may be set as a threshold. For example, a match may be found if at least 8 of 12 comparators indicate a match, or if a particular identified subset of all of the comparators (e.g., comparators for frequencies F1-F6, F9, and F12) indicate a match. Additionally, a particular comparator may determine a match if the vibration amplitude of its corresponding tuning fork is within a threshold range of the reference amplitude (e.g., an exact frequency match need not be required).

At step 812, the system may activate the voice recognition circuit 760. After a determination that all comparators output a match with a pre-stored frequency signature, or a predetermined threshold value has been met (e.g. 90% of the comparators have output a match), voice recognition circuit may be activated. The threshold value may be 100% or lower than 100% based on the preferences of system administrators. The comparators may be coupled with multiple voice recognition devices. There may be different thresholds for the activation of the different voice recognition devices based on the same audio input. For example, a first voice recognition circuit may be activated if 90% of the comparators have output a match. A second voice recognition may be activated if 80% of the comparators have output a match.

At step 814, the system may determine whether a command is detected. After the voice recognition is activated, the voice recognition process will process the remaining audio input in the sound to determine whether it detects a spoken command. The voice recognition circuit 760 may listen to the command for a predetermined period of time after activation. The voice recognition circuit 760 may apply one or more filters to look for certain key words or sound patterns to determine the command carried by the audio input. The command may be stored in a memory, such as a non-volatile memory local to the voice recognition circuit.

The voice recognition circuit may perform a determination as to the applicability of the command of the voice input to the one or more power-consuming devices which may be powered by the voice recognition circuit. For example, the command of the voice input may include an identifier which may identify one of the power-consuming devices. As an example, the identifier may indicate a switch communicatively coupled to the voice recognition circuit or may indicate a logical address or network address of a power-consumption device (e.g., "actuate switch 2," "empower device XXX.YY.ZZZ.AA," "empower devices XYZ1 and ABC2.")

If the system determines that no command is detected in the voice input (step 814=No), the system may proceed to step 820, where the voice recognition circuit may go back to sleep. For example, the voice recognition circuit may cause the switch actuated at step 812 to disconnect, toggle, or become non-conductive.

If the system determines that a command is detected (step 814=Yes), the process may proceed to step 816 and the voice recognition circuit 760 may process the command. For example, this may include identifying a type of command and the voice recognition circuit 760 may determine the applicability of the command to one or more power-consumption devices that may be powered by the voice recognition circuit 760. For example, the command may include an instruction for a DVR to record a television program, and the voice recognition circuit 760 may determine that there are one or more DVRs which could be powered by operation of the voice recognition circuit (e.g., the voice recognition circuit could activate an outlet or otherwise provide power to one or more DVRs). The voice recognition circuit 760 may make a determination to empower one or more of the DVR devices based on information in the instruction or other information known or available to the voice recognition circuit (e.g., one DVR is already recording or scheduled to record a program, the available free space of one DVR exceeds the free space estimated to be needed to record the program, one DVR may record high-definition content, one DVR is a network-capable or "multi-room" DVR, and so on). The voice recognition circuit may make a determination not to empower one or more devices based on the instructions, such as a lighting fixture or computing device lacking recording capabilities.

At step 818, the system may determine whether there is more command in the audio input. If there is more command, the process may proceed to step 816 to process the additional command. If there is no more command, the process may go to step 820 and the voice recognition circuit 760 may go back to sleep.

Before the voice recognition circuit 760 goes back to sleep, the system may determine whether the power-consumption devices 770 should be deactivated. For example, the command in the voice input may indicate that a device is to be depowered or deactivated (e.g., a powered device does not need to be powered at this point in time.)

The voice recognition circuit 760 may send a message to the power-consumption devices 770 to determine if the power-consumption devices 770 may be depowered, and the voice recognition circuit 760 may receive a message from the power-consumption devices 770 indicating that it is "safe" or "acceptable" for the power-consumption devices 770 to be depowered. The voice recognition circuit 760 may periodically or at predetermined times perform this polling or querying to determine what power-consumption devices 770 may be depowered. After determining that the power-consumption devices 770 may be deactivated, the voice recognition circuit 760 may send a signal to one or more outlets to depower, toggle, actuate, break connection, cease enabling, or become non-conductive a gate, relay, transistor, thyristor, or the like. The voice recognition circuit 760 may return to a sleep state by toggling, actuating, decoupling, and so on the switch actuated at step 812. The sleep state may result in zero consumption of energy or power, or minimal consumption of energy and power which may result from parasitic or leak currents, resulting from unavoidable imperfections of insulators, physical properties of materials, or the like.

Figure 9:
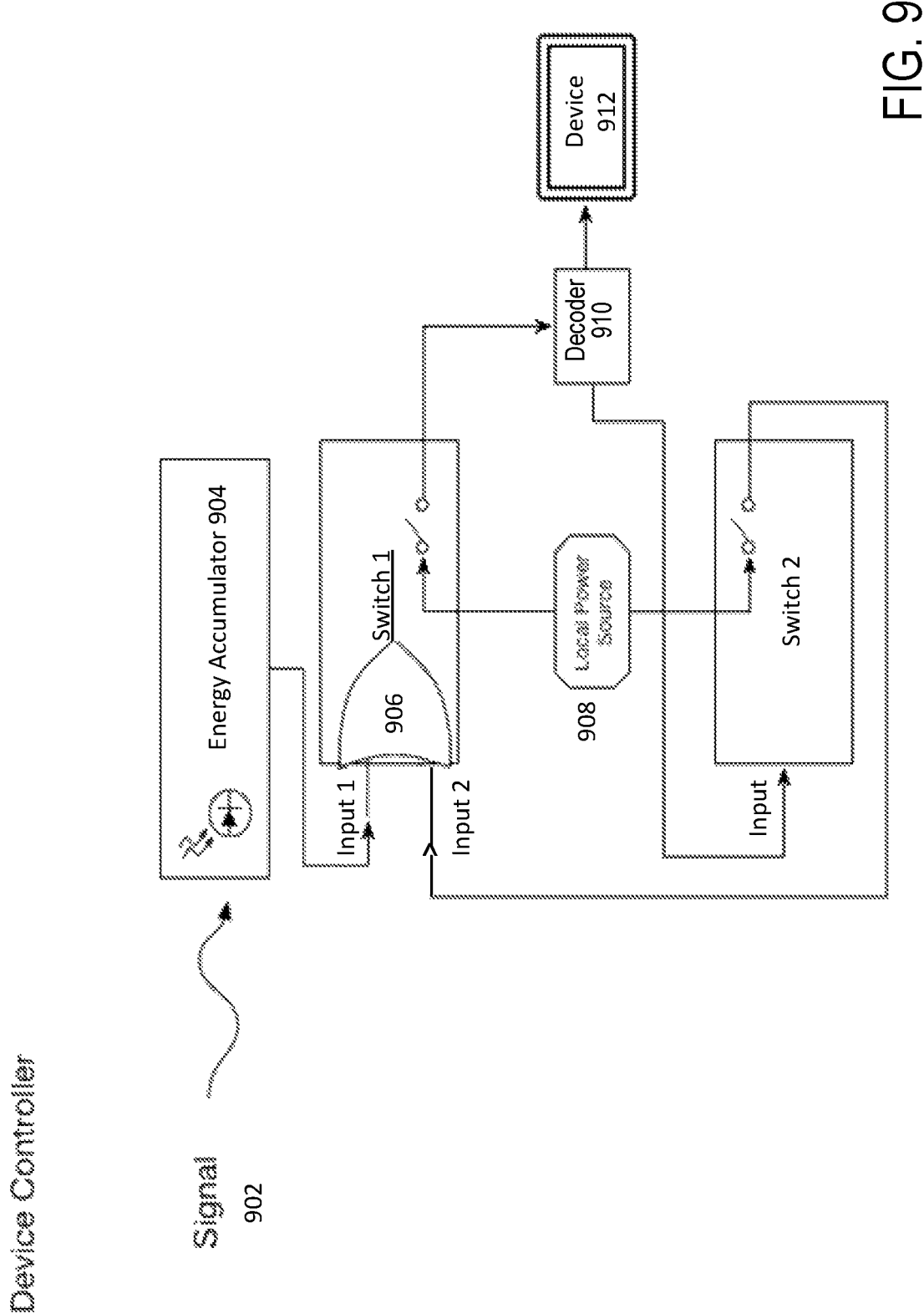
FIG. 9 depicts an illustrative diagram showing aspects of devices described herein.

FIG. 9 depicts another illustrative diagram of components which may be used according to one or more aspects of the present disclosure. As depicted, an energy accumulator 904 may be coupled with an OR gate 906. The energy accumulator 904 may receive signal 902 via any transmittable form of energy (e.g. via light in a laser beam). The energy accumulator 904 may capture and store the transmittable form of energy received at the energy accumulator 904. For example, the energy accumulator 904 may include a solar cell that converts light into electrical energy, which may be sent to a capacitor for storage. A laser, having data modulated thereon, may be aimed at the solar cell for a threshold time duration. After the capacitor storage reaches a threshold level, the capacitor energy may activate a decoder that is otherwise in a "sleep" mode. The light or laser may cause electromagnetic radiation within certain frequency or wavelength spectrum. A pre-configured frequency signature or signature collection for a user may be stored in a reference database. The activated decoder may recognize this frequency signature or signature collection. The activated decoder may take any desired action, such as monitoring for the presence of a data signal. The light may also carry this data signal, and the activated decoder may be a device to detect the data. The light in the laser beam may initially provide energy to charge the capacitor, which may in turn activate a detector and/or a demodulator that can monitor the laser beam for the presence of the modulated data. The time duration may be of sufficient length to allow both the charging of the capacitor and the functioning of the detector and/or demodulator device. For example, a laser beam may be transmitted in space to reach a solar cell on a satellite, which may in turn covert the light into electrical energy to be stored in a capacitor. After the capacitor storage reaches a threshold level, the capacitor energy may activate a decoder in the satellite that is otherwise in a "sleep" mode. The activated decoder may monitor for the presence of a data signal in the laser beam and cause further operations of the satellite accordingly.

When the energy accumulator 904 has accumulated enough energy that reaches a threshold value, the energy accumulator 904 may generate an input 1 to the OR gate 906. The OR gate 906 may receive two inputs—input 1 from the energy accumulator 904 and input 2 from a local power supply (LPS) 908. Either input 1 or input 2 may generate an output that closes a switch 1 when input 1 from the energy accumulator 904 is above the threshold value or input 2 from LPS 908 is above a threshold. Switch 1 may control the flow of power from the LPS 908 to a decoder 910 to activate the decoder 910.

Closing switch 1 may allow the LPS 908 to power the decoder 910. Once the decoder 910 receives power from the LPS 908, the decoder 910 may process the message, information, or data in the transmitted signal 902 and/or decode the message, command, and/or instructions. For example, the decoder 910 may decode authentication commands and take any action instructed by the signal 902. The decoder 910 may compare the frequency signature or signature collection in the signal 902 for the authentication of the user. If a match is found, the decoder 910 may cause the actions instructed by the signal 902.

The decoder 910 may process commands received concurrently. For example, user A may transmit a first signal while user B may transmit a second signal, which may arrive at the decoder 910 concurrently. These two signals may be processed concurrently or sequentially as determined by the configuration of the decoder 910. For example, these two signals may be processed concurrently, when a first processor in the decoder 910 may process the signal from user A, and a second processor in the decoder 910 may process the signal from user B. These two signals may be processed sequentially, when the decoder 910 may store the signal from user B in a memory and process the signal from user A first. The decoder 910 may subsequently retrieve the signal from user B from the memory and process it accordingly.

The command and/or instruction received by the decoder 910 may cause the decoder 910 to enable or control a switch 2. This control may cause, for example, switch 2 to close or conduct, allowing for current to flow to switch 2 and keeping switch 1 activated even in the absence of the transmitted signal. After the closing of switch 2, the LPS 908 may also provide power to power-consumption devices such as device 912. For example, the decoder 910 may determine the applicability of one or more received commands to one or more power-consumption devices, outlets, users, and the like known to the decoder 910. For example, the decoder 910 may determine the command indicates an identifier for one or more power-consumption devices, and the decoder 910 may empower the power-consumption devices.

The decoder 910 may receive a command in the transmitted signal to depower the power-consumption device. The decoder may also be coupled to a timer which indicates the power-consumption device may be depowered. The decoder 910 may query or poll the power-consumption device. The decoder 910 may in turn, receive a signal from the power-consumption device indicating that it is "safe" or "acceptable" for the power-consumption device to be depowered. After receiving a confirmation that the power-consumption device may be depowered safely, the decoder 910 may deactivate switch 2. As discussed above, this may include transmitting a signal to switch 2 to depower, toggle, actuate, break connection, cease enabling, or become non-conductive of switch 2 that was actuated previously. After the de-activation of switch 2, the LPS 908 may cease providing power to the power-consumption device. The decoder 910 may also de-activate switch 1. In the absence of the LPS 908 and the signal 902, the power-consumption device may enter a depowered state. The depowered state may result in zero consumption of energy or power, or minimal consumption of energy and power resulting from parasitic or leak currents.

Figure 10:
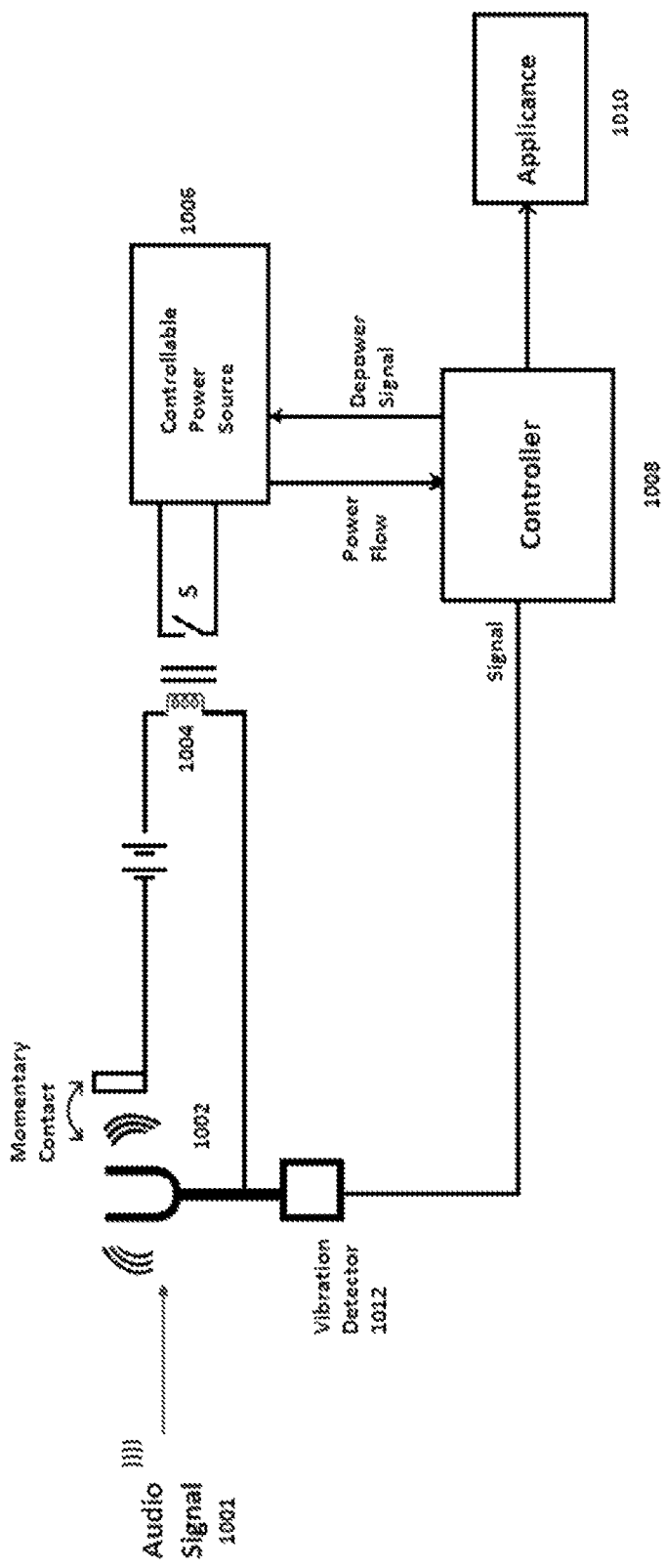
FIG. 10 depicts an illustrative diagram showing aspects of devices described herein.

FIG. 10 depicts another illustrative diagram of components which may be used according to one or more aspects of the present disclosure. As depicted, a tuning fork array 1002 may be coupled with a relay switch 1004. A controller power source 1006 providing power to a controller 1008 may be in a depowered state. The tuning fork array 1002 may be configured to respond to signals that contain a predetermined frequency signature or signature collection in the signal. For example, tuning forks with natural frequencies that match frequencies in the signal will vibrate to their fullest extent, allowing them to close the contact gap in the relay switch 1004. The other tuning forks may vibrate slightly, and the motion of these other tuning forks may not be adequate to cause them to close the contact gap. As such, the tuning fork array 1002 may receive an audio signal 1001 that carries a pre-configured frequency signature and causes vibrations of the tuning fork array 1002. The vibration of the tuning fork array 1002 may cause contact triggering and close the contact gap relay switch 1004. The momentarily closure of the relay switch 1004 may in turn close the circuit and activate the controllable power source 1006, which may remain powered even in the absence of the closure of the relay switch 1004. For example, the relay switch 1004 may be a gate, thyristor, relay, or any other type of switch device/component. While in an active state, the controllable power source 1006 may furnish the necessary power to the controller 1008, which may cause further actions on power consumption devices such as appliance 1010.

At the base of the tuning fork array 1002, a vibration detector 1012 may be coupled with the tuning fork array 1002. The vibration detector 1012 may measure the intensity of the matching signal in the tuning fork array 1002. The vibration detector may capture not only the tuning fork vibrations, i.e. frequency match, but also the intensity of the vibrations, thus indirectly capturing the intensity or amplitude of that frequency in the audio signal. The vibration detector 1012 may be part of the circuitry connected to the controller 1008 and may be powered when the controller 1008 is powered. The controller 1008 may receive the signal from the vibration detector 1012, process the signal and perform any necessary computations to determine an action to perform on the appliance 1010. After the controller 1010 determines that no further action is necessary, the controller 1010 may send a depower signal to the controllable power source 1006. The depower signal may instruct the controllable power source 1006 to be turned off. As a result, the controller 1008 and the vibration detector 1012 may enter a depowered state.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
   selecting a tuning fork, from a plurality of tuning forks that have different harmonic frequencies, based on a user's voice corresponding to a harmonic frequency of the selected tuning fork;
   receiving, via the selected tuning fork, a first portion of an audio input from the user;
   comparing a vibration amplitude of the selected tuning fork with a reference amplitude corresponding to the selected tuning fork;
   based on the comparison, performing voice recognition to determine one or more voice commands in a second portion of the audio input; and
   causing an action based on the one or more voice commands.

2. The method of claim 1, further comprising:
prior to receiving the first portion of the audio input, prompting the user to provide a test audio input;
determining, based on the test audio input, the reference amplitude for the selected tuning fork; and
storing the reference amplitude.

3. The method of claim 1, wherein the causing the action comprises:
activating a power consumption device based on the one or more voice commands.

4. The method of claim 1, further comprising:
configuring a comparator to monitor the plurality of tuning forks; and
comparing vibration amplitudes of the plurality of tuning forks with reference amplitudes of the plurality of tuning forks.

5. The method of claim 1, wherein the comparing the vibration amplitude comprises:
configuring a corresponding comparator for each of the plurality of tuning forks; and
determining that each comparator has detected, at the tuning fork corresponding to the comparator, a match with a reference amplitude associated with the tuning fork.

6. The method of claim 1, wherein the performing the voice recognition comprises:
configuring a corresponding comparator for each of the plurality of tuning forks; and
performing the voice recognition based on determining that a threshold quantity of tuning forks, comprising a subset of the plurality of tuning forks, produced a match to their reference amplitudes.

7. The method of claim 1, wherein the audio input comprises an input from an electronic beep, a hand clap, an audio recording, a musical instrument, or a voice input.

8. A method comprising:
selecting a tuning fork, from a plurality of tuning forks that have different harmonic frequencies, based on a user's voice corresponding to a harmonic frequency of the selected tuning fork;
configuring, based on an audio input from the user, a comparator with a reference amplitude of the selected tuning fork;
receiving, from the comparator, a signal indicating a match of a vibration amplitude of the selected tuning fork with the reference amplitude of the selected tuning fork; and
based on the signal, causing a performance of voice recognition.

9. The method of claim 8, wherein the signal indicates that a plurality of vibration amplitudes, of the plurality of tuning forks, matched a corresponding plurality of reference amplitudes.

10. The method of claim 8, further comprising:
receiving a test voice input from the user;
monitoring vibrations of the plurality of tuning forks based on the test voice input; and
storing information associating reference amplitudes of a subset of the plurality of tuning forks with the user.

11. The method of claim 8, wherein the causing the performance of voice recognition comprises:
activating a power consumption device based on the audio input.

12. The method of claim 8, wherein the audio input comprises a digital video recorder recording instruction.

13. The method of claim 8, wherein the audio input comprises an input from an electronic beep, a hand clap, an audio recording, a musical instrument, or a voice input.

14. The method of claim 8, further comprising:
storing voice information for a plurality of users, wherein the voice information for each of the users indicates a different set of tuning fork vibration amplitudes based on a voice of a corresponding user; and
activating voice recognition based on detecting a match between tuning fork vibration amplitudes in a received audio input and the stored voice information.

15. A system comprising:
a plurality of tuning forks; and
a computing device comprising:
one or more processors; and
memory storing computer-readable instructions that, when executed by the one or more processors, cause the computing device to:
select a tuning fork, from the plurality of tuning forks that have different harmonic frequencies, based on a user's voice corresponding to a harmonic frequency of the selected tuning fork;
receive, via the selected tuning fork, a first portion of an audio input from the user;
compare a vibration amplitude of the selected tuning fork with a reference amplitude corresponding to the selected tuning fork;
based on the comparison, perform voice recognition to determine one or more voice commands in a second portion of the audio input; and
cause an action based on the one or more voice commands.

16. The system of claim 15, wherein the computer-readable instructions, when executed by the one or more processors, further cause the computing device to:
prior to receiving the first portion of the audio input, prompt the user to provide a test audio input;
determine, based on the test audio input, the reference amplitude for the selected tuning fork; and
store the reference amplitude.

17. The system of claim 15, wherein the computer-readable instructions, when executed by the one or more processors, further cause the computing device to cause the action by:
activating a power consumption device based on the one or more voice commands.

18. The system of claim 15, wherein the computer-readable instructions, when executed by the one or more processors, further cause the computing device to:
configure a comparator to monitor the plurality of tuning forks; and
compare vibration amplitudes of the plurality of tuning forks with reference amplitudes of the plurality of tuning forks.

19. The system of claim 15, wherein the computer-readable instructions, when executed by the one or more processors, further cause the computing device to compare the vibration amplitude by:
configuring a corresponding comparator for each of the plurality of tuning forks; and
determining that each comparator has detected, at the tuning fork corresponding to the comparator, a match with a reference amplitude associated with the tuning fork.

20. The system of claim 15, wherein the computer-readable instructions, when executed by the one or more processors, further cause the computing device to perform the voice recognition by:
- configuring a corresponding comparator for each of the plurality of tuning forks; and
- performing the voice recognition based on determining that a threshold quantity of tuning forks, comprising a subset of the plurality of the tuning forks, produced a match to their reference amplitudes.

21. The system of claim 15, wherein the audio input comprises an input from an electronic beep, a hand clap, an audio recording, a musical instrument, or a voice input.

* * * * *

UNITED STATES PATENT AND TRADEMARK OFFICE
CERTIFICATE OF CORRECTION

| | | |
|---|---|---|
| PATENT NO. | : 11,956,503 B2 | Page 1 of 1 |
| APPLICATION NO. | : 16/953969 | |
| DATED | : April 9, 2024 | |
| INVENTOR(S) | : Tsung-Hsiang Hsueh | |

It is certified that error appears in the above-identified patent and that said Letters Patent is hereby corrected as shown below:

In the Drawings

Sheet 11, Figure 10, Reference Numeral 1010:
Delete "Applicance" and insert --Appliance--

In the Specification

Column 24, Line 32:
Delete "1010" and insert --1008--

Column 24, Line 34:
Delete "1010" and insert --1008--

Signed and Sealed this
Twenty-third Day of September, 2025

John A. Squires
*Director of the United States Patent and Trademark Office*